United States Patent [19]
Maeda et al.

[11] Patent Number: 5,956,302
[45] Date of Patent: Sep. 21, 1999

[54] OPTICAL PICK-UP DEVICE AND METHOD USING A HIGH-DENSITY DOUBLE DIFFRACTION GRATING

[75] Inventors: Hideo Maeda, Yokohama; Shigeru Ohuchida, Zama, both of Japan

[73] Assignee: Ricoh Company, Ltd., Tokyo, Japan

[21] Appl. No.: 08/882,828

[22] Filed: Jun. 26, 1997

Related U.S. Application Data

[63] Continuation of application No. 08/291,912, Aug. 17, 1994, abandoned.

[30] Foreign Application Priority Data

Aug. 17, 1993 [JP] Japan ................................. P5-203430
Nov. 29, 1993 [JP] Japan ................................. P5-297756

[51] Int. Cl.⁶ ........................................ G11B 7/095
[52] U.S. Cl. ........................................ 369/44.23; 369/112
[58] Field of Search ...................... 369/44.23, 112

[56] References Cited

U.S. PATENT DOCUMENTS

| | | | |
|---|---|---|---|
| 5,101,389 | 3/1992 | Ohuchida et al. | 369/44.23 |
| 5,243,583 | 9/1993 | Ohuchida et al. | 369/44.23 X |
| 5,360,970 | 11/1994 | Kay | 369/44.23 X |
| 5,361,244 | 11/1994 | Nakamura et al. | 369/44.23 |
| 5,391,865 | 2/1995 | Kurata et al. | 369/44.23 X |

*Primary Examiner*—W. R. Young
*Attorney, Agent, or Firm*—Oblon, Spivak, McClelland, Maier & Neustadt, P.C.

[57] ABSTRACT

An optical pick-up having a high-density double diffraction grating constructed with two high-density diffraction gratings superposed on each other wherein polarized light rays are separated so that P-polarized light rays pass through the double diffraction grating and S-polarized light rays are diffracted. The optical pick-up is disposed in the optical path between a light source and a recording medium.

14 Claims, 23 Drawing Sheets

OPTICAL DISK

LIGHT SOURCE

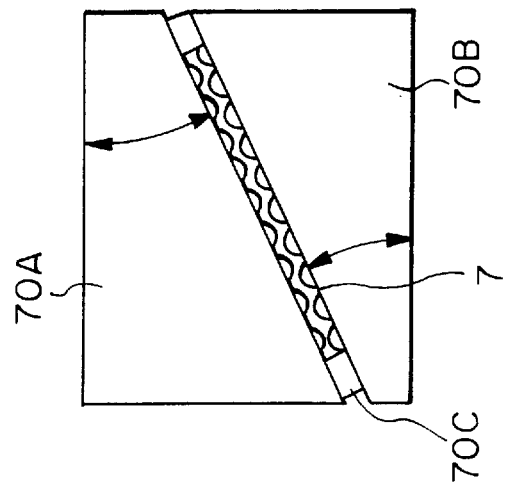
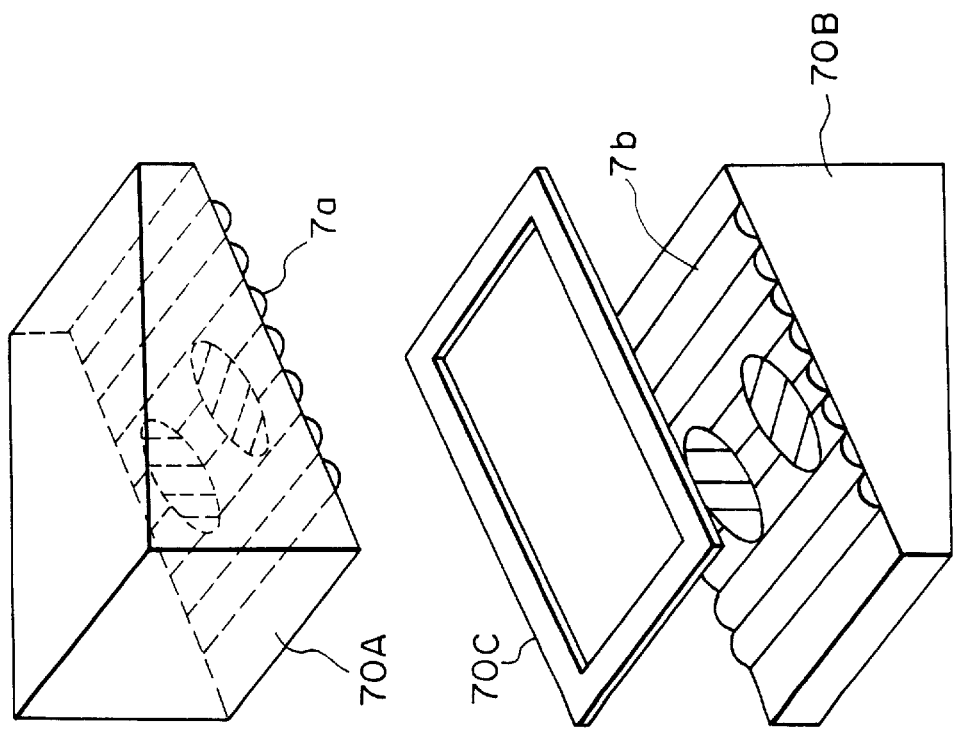

PRIOR ART
Fig. 30a  Fig. 30b  Fig. 30c
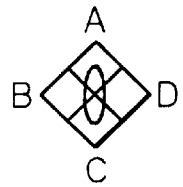
DISTANT
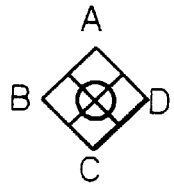
JUST
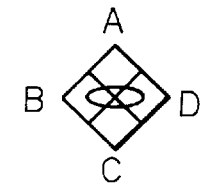
NEAR
PRIOR ART
Fig. 31
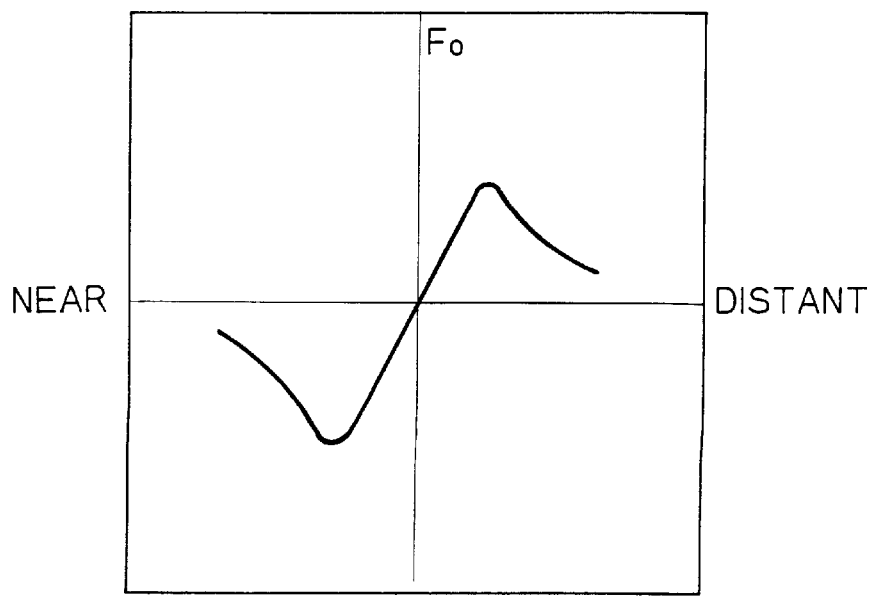

PRIOR ART
Fig. 34a  Fig. 34b  Fig. 34c
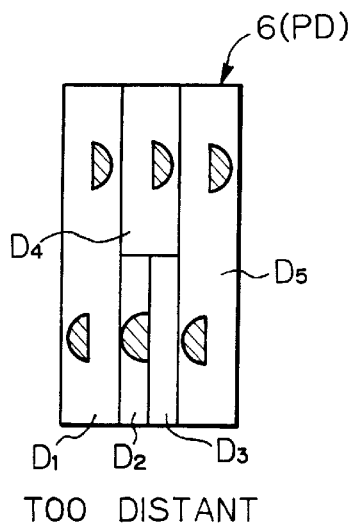
TOO DISTANT
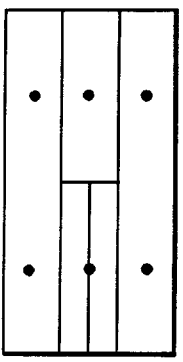
FOCUSED
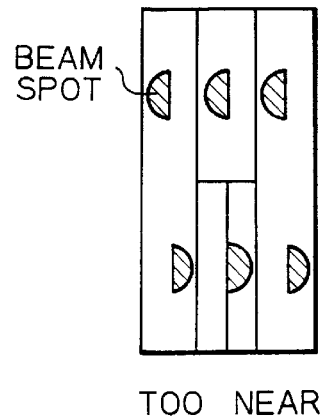
TOO NEAR
PRIOR ART
Fig. 35
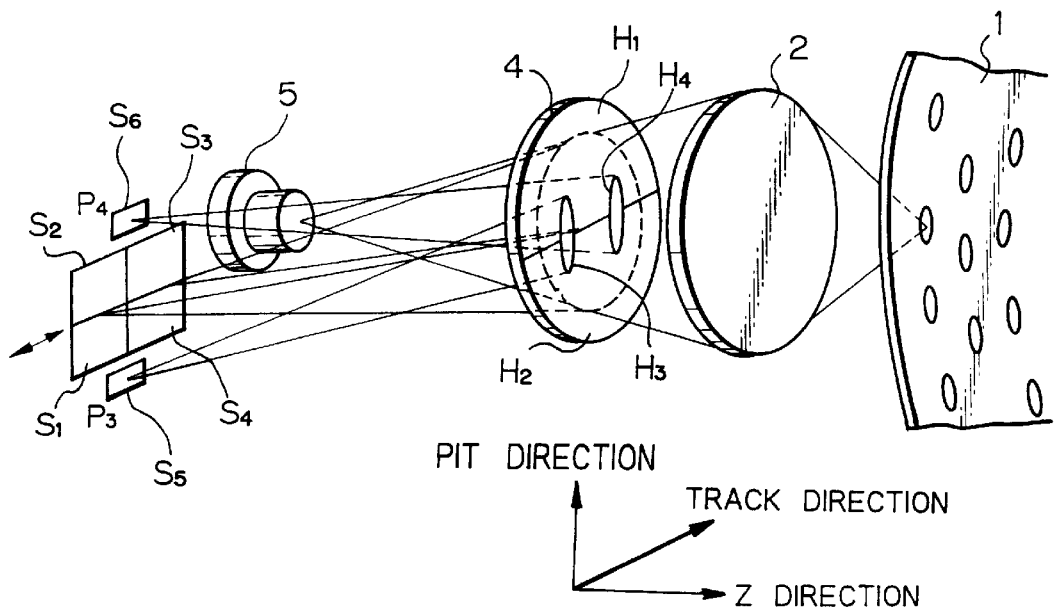

PRIOR ART

OPTICAL PICK-UP DEVICE AND METHOD USING A HIGH-DENSITY DOUBLE DIFFRACTION GRATING

This application is a Continuation of U.S. application Ser. No. 08/291,912, filed on Aug. 17, 1994, now abandoned.

BACKGROUND OF THE INVENTION

1. Field of the Invention

The present invention relates to an optical pick-up and an optical head utilizing the optical pick-up, in particular, an optical pick-up for use in an optical recording/reproducing apparatus for recording and reproducing the information to be recorded on an optical recording medium such as an optical disk by use of the reflection light rays reflected thereon, and an optical head utilizing the above-mentioned optical pick-up for recording, reproducing, and erasing the information by use of the reflected light rays from the optical information recording medium.

2. Description of the Prior Art

An optical disk apparatus has a large capacity, compared with a hard disk apparatus or a magnetic tape apparatus, etc. However, since the optical disk apparatus has not yet accomplished higher access speed, it has fallen behind the magnetic recording apparatus in field of the high-speed read-out devices. Various attempts have been made to improve the access time. As to the approach by utilization of the optical system, its a main stream to aim is realizing a small-sized and light-weight optical pick-up by reducing the number of employed optical parts.

And further, research of the above matters has been vigorous, in the field of "write-once", CD (Compact Disk), and the like. One of the to the adoption of a diffraction grating. Since the diffraction grating can concentrate the functions of the individual optical parts, it is possible to effectively reduce the number of optical parts. The works by Lee et al. are well known in the art.

The diffraction grating devised by Lee et al. concentrates the functions a beam splitter, cylindrical lens, or the like. And structurally, a, it is made of a thin plate and suitable for being small-sized. FIG. 28 is an explanatory view showing an optical pick-up employing the above diffraction grating.

In FIG. 28, the outgoing light rays emitted from a semiconductor laser (LD) 5 enter a diffraction grating 4 as incident light rays thereto.

The rate of the transmission of the light rays passing through the diffraction grating 4 is almost 70%. The diffracted light rays occur in several orders. The maximum diffraction efficiency of the ±1-order light rays utilized for detection is almost 10%. The transmission light rays passing through the diffraction grating 4 are collimated by a collimation lens 3. On this occasion, the round portion of the outgoing light rays emitted from the semiconductor laser 5 is drawn out by the collimation lens 3, and thereby beam-forming is performed. (In the other hand, the collimated light rays are focusedly radiated on an optical disk 1 by an objective lens 2, and the reflection light rays reflected on the optical disk 1 pass through the same optical route and arrive at the diffraction grating 4.

The diffracted light rays are employed for detecting the signal emitted from the above-mentioned optical pick-up. The pitch of the diffraction grating 4 is treated by charping for monotonously increasing or decreasing the pitch thereof depending on its position. (Such grating is called "a charped diffraction grating".) The diffracted light rays obtain same effect as in the case of passing through the cylindrical lens. As shown in FIG. 29, regarding the diffracted light rays, there exists a difference in the function of the convex/concave lens by the action of the ±1-order light rays. It is permitted to use any one of both diffracted light rays employed for detecting the signal. Concerning the optical pick-up shown in FIG. 28, the case of employing the convex lens is explained.

The incident light rays entering the diffraction grating 4 have an astigmatism, since the function of the above-mentioned convex lens exerts an influence on the focused light rays. Consequently, the focused light rays emitted from the collimation lens 3 enter the branched diffraciton grating 4 as the incident light rays, and thereby the diffracted light rays show the astigmatism. The focus signal Fo can be detected by use of a four-divisional light-receiving element (in general, photo-diode; PD), utilizing the astigmatism method which is well-known conventionally.

Namely, in the case of employing the photo-diode PD, the spot of the light rays varies as shown in FIG. 30 in accordance with the position of the optical disk 1 (near or far away), and the focus signal Fo is the one as shown in FIG. 31.

The track signal Tr can be obtained also by the four-divisional light-receiving element PD. And further, the recording signal Rf can be obtained from the total output. The respective signals; Fo, Tr, and Rf are expressed by the following equations (1)–(3) from FIG. 30:

$$Fo=(A+C)-(B+D) \quad (1)$$

$$Tr=(A+D)-(B+C) \quad (2)$$

$$Rf=A+B+C+D \quad (3)$$

Next, the charping is executed on the grid of the diffraction grating in order to detect the focus signal. FIG. 8 shows an example of causing a part of the diffraction grating to have a distribution of pitch and detecting even the track signal. (Refer to "Application Physics Academic Meeting 1988, Spring Preliminary Drafts Assembly, 29p-ZQ-11.)

In FIG. 5, regarding the distribution of the diffraction grating 40, the grating is constructed with a parallel grating treated with the charp (the tendons thereof are parallel with each other) and a couple of slit-state diffraction gratings, the grating direction of which is inclined to the direction of the above parallel grating. In such construction, the slit-state diffraction grating distributes the track patterns appearing on the surface of the diffraction grating onto the two photo-diodes (PDs) as shown by TE in FIG. 32.

Parallel light rays enter the diffraction grating 40 as incident light rays. And further, a lens 30 is disposed at the downstream side of the diffraction grating 40. In such construction, the track signal can be obtained from the difference of the output signals emitted by two PDs represented by TE, utilizing the push-pull method which is the conventional method of detecting the track signal. Furthermore, the focus signal can be obtained by the four-divisional PDs represented by FE in FIG. 32 utilizing the astigmatism method as mentioned before, and the recording signal Rf can be obtained by the light intensity (Rf in FIG. 32) itself of the transmission light rays passing through the lens 30.

Hereupon, although Lee et al. took the initiative in divising the pick-up (PU) employing the diffraction grating, Sharp Co., Ltd. put it to practical use. The practical structure and its function of the PU are desribed hereinafter as an example referring to the document "Sharp Technical Report No.42/1984, P45."

FIG. 33 shows the structure of the PU. In FIG. 33, the outgoing light rays emitted from LD5 are divided into three light beams; two sub-beams for tracking and a main-beam for reading out the information signal, by use of the diffraction grating for creating the tracking beam which is formed on the rear surface of the diffraction grating 4.

And further, the outgoing light rays emitted from LD5 pass through the diffraciton grating 4 of the upper surface as the 0(zero)-order light rays and are focused on the optical disk 1 by the objective lens 2, after being converted to the parallel light rays by use of the collimation lens 3.

On the other hand, the reflected light rays modulated by the pit on the optical disk 1 are diffracted by the diffraction grating 4, after passing through the objective lens 2 and the collimation lens 3. The diffracted light rays are guided onto the five-divisional PD 6 as the 1-order light rays. The diffraction grating 4 is constructed with two areas having two different grating frequencies respectively. The reflected light rays of the main-beam entering one area thereof as the incident light rays are focused on the divisional line of the light-detecting portions $D_2$ and $D_3$, while the reflected light rays of the main-beam entering another area thereof also as the incident light rays are focused on the light-detecting portion $D_4$. And further, the reflected light rays of the sub-beam are respectively focused on the light-detecting portions $D_1$ and $D_5$. Those focused light rays vary as shown in FIG. 34 in accordance with the light-focusing condition of the beam on the optical disk 1.

Consequently, assuming that the outputs of the respective segments of the five-divisional PD 6 are, respectively, $S_1$, $S_2$, $S_3$, $S_4$, and $S_5$, the focus error signal Fo is expressed by the following equation (4), utilizing the knife-edge method:

$$Fo=S_2-S_3 \quad (4)$$

On the other hand, the tracking error signal is detected by the so-called three-beams method. Since the sub-beam for tracking are respectively focused on the light-detecting protions $D_1$ and $D_5$, the tracking error signal Tr is expressed by the following equation (5):

$$Tr=S_1-S_5 \quad (5)$$

And further, the recording signal Rf is expressed by the following equation (6):

$$Rf=S_2+S_3+S_4 \quad (6)$$

Next, another example of the pick-up (PU) employing the diffraction grating made by NEC is shown in FIG. 35 (Script of Comprehensive All-Japan Meeting of Electronic Information/Communication Academic Society for celebrating the 70th Anniversary of the Founding of the Academic Society, Showa 62/1987, 1014). The PU of NEC employs the knife-edge method as in the case of the above-mentioned diffraction grating made by Sharp. In addition, the diffraction grating of the NEC PU is constructed by the push-pull method.

Regarding the case of the NEC PU, the double knife-edge method of combining two knife-edge methods employed also by Sharp is employed as the focus detecting method.

In such detecting method, the stability of detecting can be increased by combining the two knife-edge methods. In the latter case of NEC, the track signal can be obtained by forming the slit-state diffraction grating.

In addition to the aforementioned prior art, the optical head of the prior art relevant to the above optical pick-up is described hereinafter.

The construction of the conventional optical head is explained, referring to FIG. 37. The light rays emitted from the laser light source 1 are separated into the light ray fluxes of the 0(zero)-order light rays 4a and the ±1-order light rays 4b and 4c, by causing the emitted light rays to enter the diffraction grating surface 3 of the holographic grating 2 as the incident light rays.

Those separated light rays fluxes are focused by the objective lens (not shown) and an optical spot is formed on the surface of the optical disk (not shown) to be employed as the optical information recording medium. The 0(zero)-order light rays 4a read out the information on the surface of the disk, and the ±1-order light rays 4b and 4c detect the state of the track. Thereafter, the ±1-order light rays become the reflected light rays, and enter again the holographic grating 2 as the incident light rays, and thereby the light rays are separated into the transmission (passing-through) light rays directed to the laser light source 1 and the diffraction light rays directed to the light-receiving element 7. On this occasion, the diffraciton light rays are separated into two groups of the 1-order diffraction light rays; 5a, 5b, and 5c and the other 1-order diffraction light rays; 6a, 6b, and 6c, and all of those six light rays are guided to six light-receiving surfaces a~f of the light-receiving elements 7. FIGS. 38a through 38c show, respectively, the shapes of the light spots on the surface of the light-receiving elements 7.

FIG. 38b shows the shapes of the light spots when the disk surface is located at the focus position. FIG. 29a shows the shapes thereof when the disk surface is located at the place nearer than the focus position, while FIG. 29c shows the shapes thereof when the disk surface is located at the place more distant than the focus position.

Hereupon, the focus error signal Fe is detected utilizing the Wedge-prism Method, and the track error signal Te and the reproduction signal Rf are respectively detected utilizing the three-beams method. The calculation equations are as follows:

$$Fe=(a+d)-(b+c)$$

$$Te=e-f$$

$$Rf=a+b+c+d$$

As mentioned above, the optical head is constructed such that the laser light source 1 and the light-receiving element 7 are disposed on the same-level plane and the holographic grating 2 is employed for making the optical head. In such construction, it is possible to perform stable signal detection with the small-sized and low-cost optical head.

Concerning the aforementioned optical pick-up, the output light rays emitted from the semiconductor laser (LD) are radiated onto the optical disk through the diffraction grating, and the reflection light rays reflected on the optical disk enter again the diffraction grating as the incident light rays. Thereby, the focus signal, the track signal, and the recording signal, etc. are detected.

Consequently, as to the conventional optical pick-up, the rate of radiating the light rays onto the optical disk in the diffraction grating is almost 70%. Regarding the light rays detected by the photo-diode (PD) among the reflection light rays reflected on the optical disk, since its diffraction efficiency is almost 10%, the utilization efficiency of the light rays emitted from the light source (LD) is only 0.7×0.1=7%. Therefore, the utilization efficiency of the light rays is considerably lowered. This is the defect of the prior-art optical pick-up.

In the conventional optical head as shown in FIG. 37, the holographic grating 2 has only a function of causing the light rays to branch off. Therefore, since some of the diffraction light rays among the light rays emitted from the laser light source 1 and entering the holographic grating 2 as the incident light rays are not radiated onto the optical disk, or some of the transmission light rays reflected on the disk surface and entering again the holographic grating 2 as the incident light rays and passing therethrough are not guided to the light receiving element 7, the efficiency of utilizing the light rays turns out to be worse.

Such phenomenon of lowering the efficiency of utilizing the light rays does not cause any serious problems for the optical head (CD, LD, etc.) specially employed for reproducing only. However, in the case of employing the additionally-writing-in-type of optical head and/or the rewriting-type of optical head, when the efficiency of utilizing the light rays is low, sufficient power of the light rays cannot be obtained on the disk surface at the time of recording on some occasions, or it is necessary to use high-cost and high-power laser light source in order to obtain such sufficient power of the light rays. It follows that the above matters go against the attempt to realize a small-sized and low-cost optical head.

SUMMARY OF THE INVENTION

The present invention is made in consideration of the above-mentioned actual circumstances.

It is an object of the present invention to solve the afore-mentioned points at issue.

It is another object of the present invention to provide an optical pick-up capable of improving the efficiency of utilizing the light rays.

It is still another object of the present invention to provide an optical pick-up capable of causing almost 90% of the outgoing light rays emitted from the light source to pass through the diffraction grating and causing almost 85~90% of the reflection light rays emitted from the optical disk to enter the photodiode (PD) as the incident light rays.

It is still another object of the present invention to provide an optical pick-up capable of detecting the recording signal, the focus error signal, and the track error signal.

It is still another object of the present invention to provide an optical head capable of improving the efficiency of utilizing the light rays.

It is still another object of the present invention to provide a low-cost optical head, for example, employing the low-power laser light rays.

It is still another object of the present invention to provide a functionally stable optical head having further small-sized and integrated (unitary) structure by reducing the space for the optical system, and enabling to enhance the stability at the time of assembling and adjusting.

BRIEF DESCRIPTION OF THE DRAWINGS

FIGS. 13a and 13b are, respectively, an outlined exploded perspective view and an outlined side view of the embodiment in which the above-mentioned double diffraction grating is constructed with two prisms;

FIG. 24 shows the tenth embodiment according to the present invention, wherein

FIGS. 30a through 30c are outlined views respectively showing the spots on the photo-diode (PD) in the conventional optical pick-up;

FIG. 31 is a diagram(graph) showing the focus signal in the conventional optical pick-up;

FIGS. 34a through 34c are outlined views showing the focusing state of the focused beam on the light detecting portion at the above-mentioned optical pick-up made by Sharp;

FIG. 35 is an outlined perspective view showing the conventional optical pick-up made by NEC;

DETAILED DESCRIPTION OF THE PREFERRED EMBODIMENTS

Figure 1:
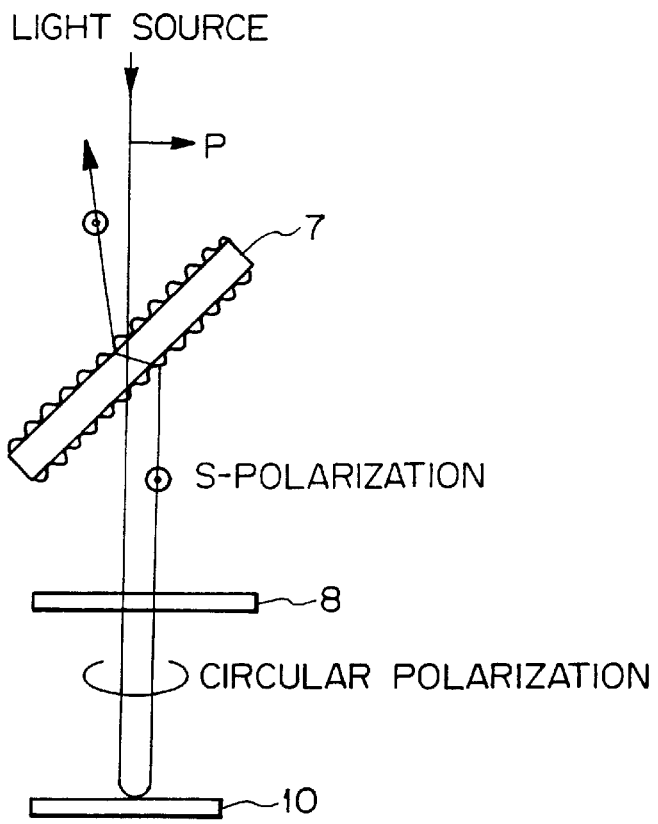
FIG. 1 is an outlined side elevational view of an optical isolator employed in the embodiments of the present invention.

In consideration of the above-mentioned matters, the preferred embodiments of the present invention are decribed hereinafter, firstly, regarding the first through fourth embodiments.

The present invention provides a construction of optical pick-up in which, in order to solve the aforementioned drawbacks, a high-density double diffraction grating formed by superposing two pieces of the high-density diffraction grating is disposed on the optical route between the light source and the recording medium such that the output light rays emitted from the light source are converted to P-polarized light rays, in the optical recording/reproducing apparatus for recording and/or reproducing the information by radiating the light rays onto the recording medium; the transmission light rays passing through the double diffraction grating are circularly polarized by a one-quarter-wavelength plate, and focused by the focusing lens and radiated onto the recording medium; the reflection light rays returning from the recording medium through the same optical route are S-polarized by causing those light rays to pass through the one-quarter-wavelength plate and are thereby S-polarized; the S-polarized light rays enter the above-mentioned double diffraction grating as the incident light rays and are polarized therein; and the focus error signal, the track error signal, and the RF signal are detected from those diffracted light rays.

According to the present invention, since the high-density double diffraction grating formed by superposing two pieces of high-density diffraction grating is disposed such that the output light rays emitted from the light source are P-polarized, almost 90% of the output light rays emitted from the light source can pass through the diffraction grating, and thereby almost 85–90% of the reflection light rays reflected on the optical disk are directed to the photo-diode (PD).

Secondly, the fifth through twelfth preferred embodiments of the present invention are described hereinafter, in order. Regarding the fifth embodiment of the present invention, in the optical head for recording and erasing the information by focusing the outgoing light rays emitted from the laser light source by use of the objective lens and radiating the light spot onto the optical information recording medium, and further for reproducing the information by guiding the reflection light rays reflected on the optical information recording medium to the light-receiving element, a prism having polarizing film formed thereon uniformly is disposed on the optical route located between the laser light source and the objective lens; and further a transmission-type diffraction element having a diffraction grating for guiding only the reflection light rays reflected on the optical information recording medium to the light-receiving element is disposed on the optical route which prohibits the outgoing light rays emitted from the laser light source to pass therethrough and causes the reflection light rays reflected on the optical information recording medium to pass therethrough via the afore-mentioned prism.

Regarding the sixth embodiment of the present invention, the optical head for recording and erasing the information by focusing the output light rays emitted from the laser light source by use of the objective lens and radiating the light spot onto the optical information recording medium, and further for reproducing the information by guiding the reflection light rays reflected on the optical information recording medium to the light-receiving element is characterized in that a prism having polarizing film formed there on uniformly is disposed on the optical route located between the laser light source and the objective lens; and further a reflection-type diffraction element having a diffraction grating is integrally (unitarily) disposed by fixing with adhesive agent on the surface opposing to the surface of the prism having the polarizing film formed thereon with a constant thickness.

Regarding the seventh embodiment of the present invention, in the optical head for recording and erasing the information by focusing the outgoing light rays emitted from the laser light source by use of the objective lens and radiating the light spot onto the optical information recording medium, and further for reproducing the information by guiding the reflection light rays reflected on the optical information recording medium to the light-receiving element, a polarization separating element having a polarization separating function of different ligh-emitting angles in accordance with the direction of polarizing is disposed on the optical route located between the laser light source and the objective lens; and further a transmission-type diffraction element having a diffraction grating for guiding only the reflection light rays reflected on the optical information recording medium to the light-receiving element is disposed on the optical route which prohibits the outgoing light rays emitted from the laser light source to pass therethrough and causes the reflection light rays reflected on the optical information recording medium to pass therethrough via the afore-mentioned polarization separating element.

Regarding the eighth embodiment of the present invention, in the fifth or seventh embodiment, a semiconductor laser is employed as the laser light source, and the diffraction grating is unitarily (integratedly) mounted on a cap for sealing the semiconductor laser therein.

Regarding the ninth embodiment of the present invention, in the fifth, sixth, or seventh embodiment, the prism or the polarization separating element having the polarizing film formed thereon, the diffraction grating, and the laser light source are disposed unitarily (integratedly).

Regarding the tenth embodiment of the present invention, in the optical head for recording and erasing the information by focusing the output light rays emitted from the laser light source by use of the objective lens and radiating the light spot onto the optical information recording medium, and further for reproducing the information by guiding the reflection light rays reflected on the optical information recording medium to the light-receiving element, two pieces of the diffraction grating provided with a light-dividing function and a polarizing/separating function in which the diffraction efficiency varies in accordance with the polarizing direction on the optical route between the laser light source and the objective lens are disposed adjacently to each other; and the grating shape of at least one of those diffraction gratings is decided such such that the pitches of the gratings or the vector direction of the the gratings are different from each other Regarding the eleventh embodiment of the present invention, in the tenth embodiment, two pieces of the diffraction grating are formed respectively on both sides of a substrate.

Regarding the twelfth embodiment of the present invention, in the tenth embodiment, the diffraction grating having the light-dividing function and the polarizing/separating function and the laser light source are disposed integratedly (unitarily).

In the fifth embodiment, since, regarding the diffraction grating of the transmission-type diffraction element, the outgoing light rays emitted from the laser light source do not pass therethrough and only the reflection light rays reflected on the optical information recording medium pass therethrough, and all of the light rays passing therethrough and diffracted thereon are guided to the light-receiving element, it is possible to eliminate the problem that, as in the past, the light intensity to be transmitted to the optical information recording medium is reduced or a part of the intensity of the reflection light reflected on the medium surface is not guided to the light-receiving element, to enhance the efficiency of utilizing the light rays, and to employ the laser light source of low power.

In the sixth embodiment, it is possible to obtain same functional effect as that of the fifth embodiment, and it is further possible to perform stable adjustment without causing any variation of the light rays radiated onto the recording medium at the time of assembling and adjusting the diffraction grating by employing the reflection-type diffraction grating in place of the transmission-type diffraction grating.

In the seventh embodiment, since the polarization separating element having the polarization separating function is employed and thereby the accuracies of the light-extingushing rate and the polarization separating angle can be further improved, it may be possible not only to improve the efficiency of utilizing the light rays but to reduce the unevenness of the assembling error.

In the eighth embodiment, the diffraction grating is integratedly (unitarily) mounted on the cap portion for sealing, and thereby it may be possible to reduce the space for the optical system and to make further small-sized and stable owing to the integrated (unitary) structure thereof.

In the ninth embodiment, the prism having the polarizing membrane or the polarization separating element is disposed integratedly (unitarily) together with the diffraction grating or the laser light source, and thereby it may be possible to make the optical head more small-sized than that of the eighth embodiment and enhance the stability at the time of assembling and adjusting the head.

In the tenth embodiment, since one diffraction grating has both of the light-dividing function and the polarization-separating function, it is possible to reduce the number of the employed parts owing to its complex function. Furthermore, it turns out to be possible to cancel the diffraction angle variation due to the variation of the wavelength which is a defect of the diffraction grating itself by adjacently disposing a couple of diffraction gratings.

In the eleventh embodiment, since a couple of diffraction gratings are respectively mounted on both surfaces of one substrate, it turns out to be possible to further reduce the number of the employed parts and obtain the stable operation against time-elapsing variation.

In the twelfth embodiment, since the diffraction grating having both of the light-dividing function and the polarizing/separating function is integratedly (unitarily) constructed together with the laser light source, it may turn out to be possible to reduce the number of the employed parts owing to its complex function, to make the optical head small-sized by constructing it integratedly(unitarily), and to obtain the stable operation against the time-elapsing variation.

DESCRIPTION OF THE FIRST THROUGH FOURTH EMBODIMENTS

The first group of the present invention is described hereinafter, in relation to the first through fourth embodiments, referring to FIGS. 1–14. In the present invention, a high-density double diffraction grating which is a primary portion of the magneto-optic PU (pick-up) relating to the previous Japanese Ricoh Patent Application (filed; on Jan. 7, 1988) plays an important role. Firstly, the high-density double diffraction grating is explained. The "high-density double diffraction grating" signifies the diffraction grating constructed with two pieces of the high-density diffraction grating constructed by superposing one upon another.

The "high-density diffraction grating" signifies the diffraction grating having a pitch equal to or smaller than the wavelength.

Figure 36:
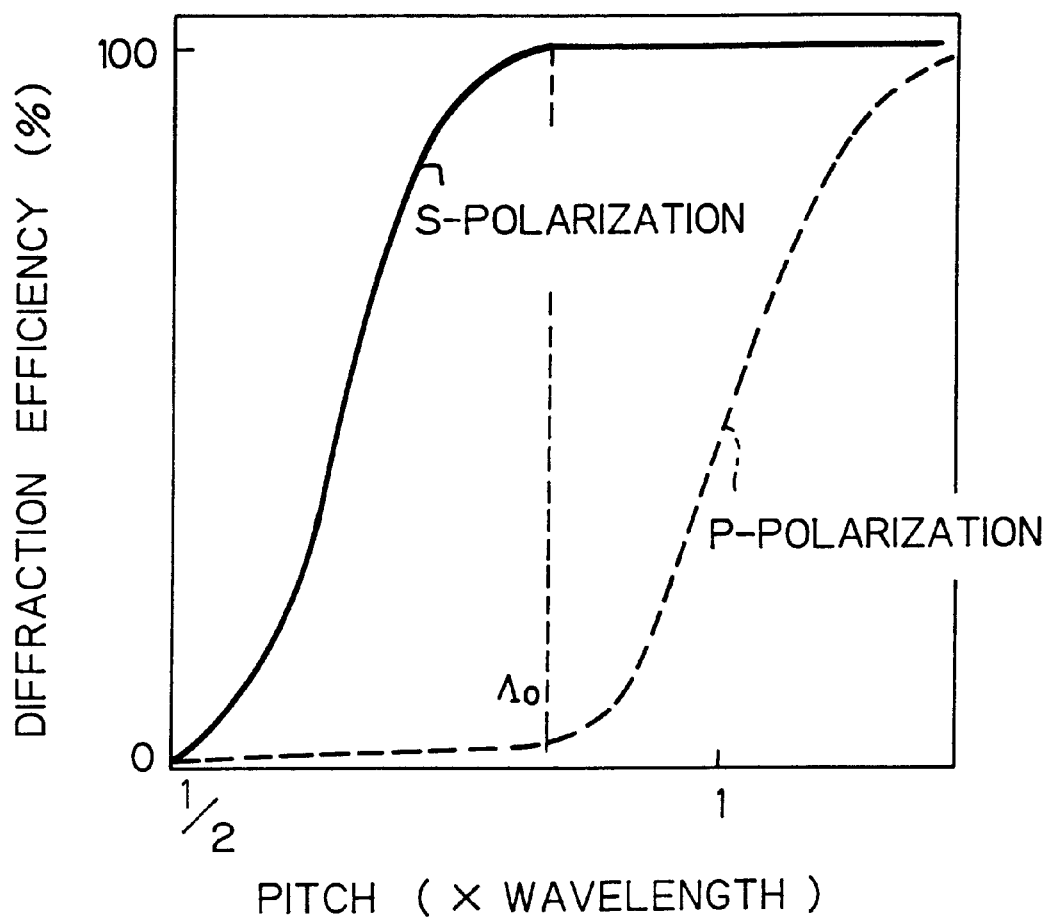
FIG. 36 is a diagram(graph) showing the relationship between the pitch of the diffraction grating and the diffraction efficiency thereof in the conventional optical pick-up.
Figure 37:
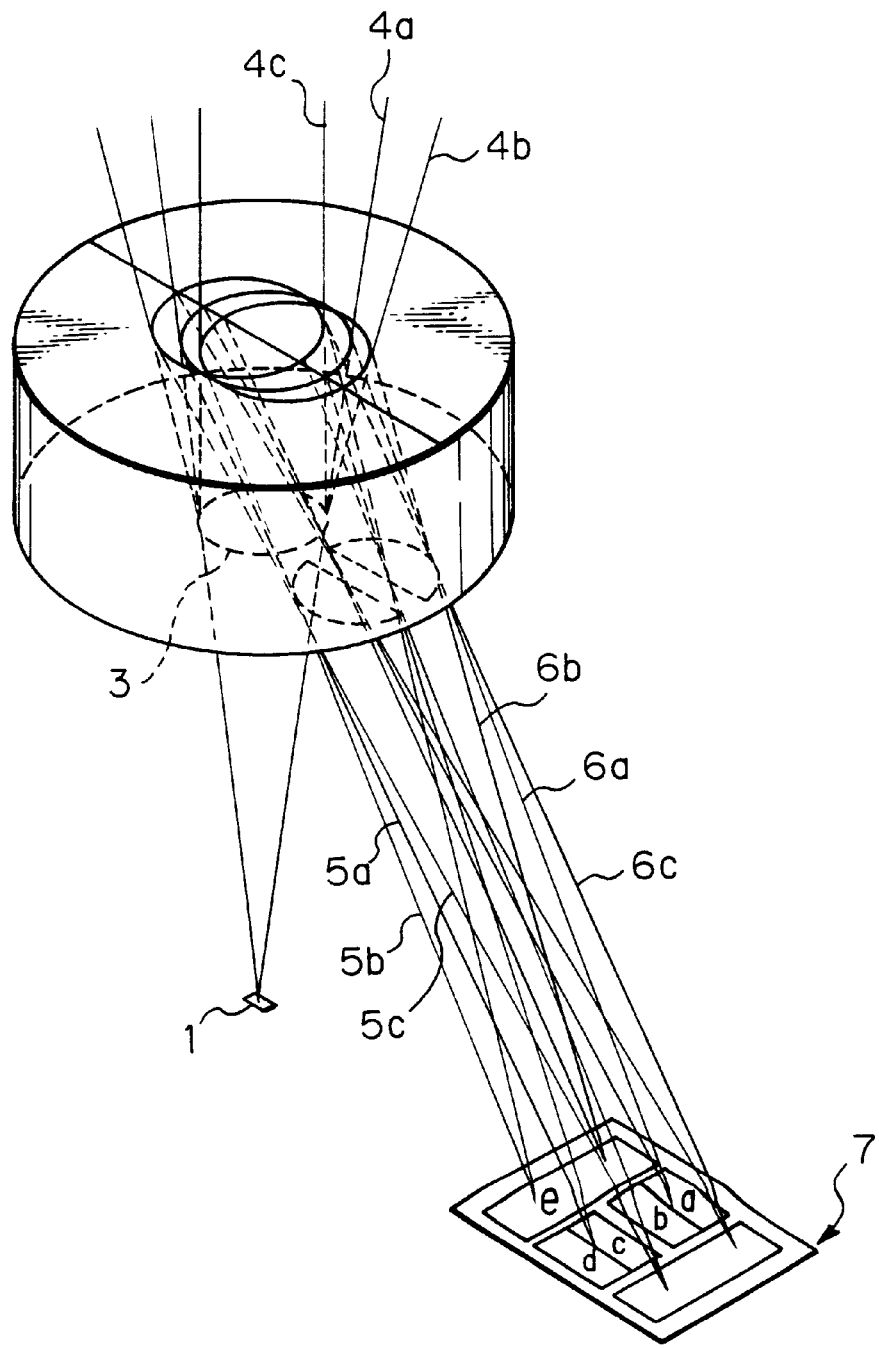
FIG. 37 is a perspective view showing the state of separating the optical route in the case of employing the conventional circuit elements.
Figure 38A:
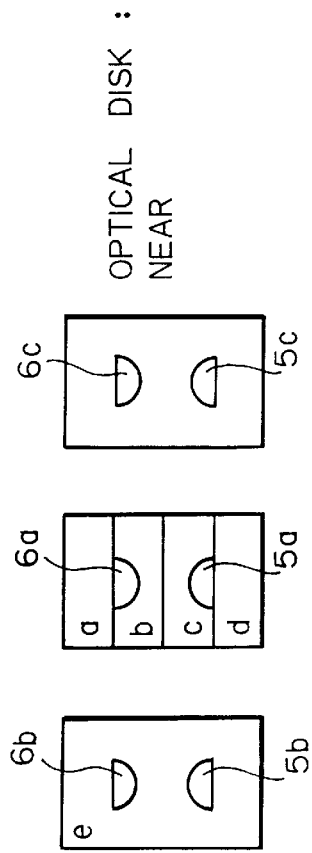
FIGS. 38a through 38c are front views respectively showing the states of the various sorts of light spots on the light-receiving surface of the light-receiving element.
Figure 38B:
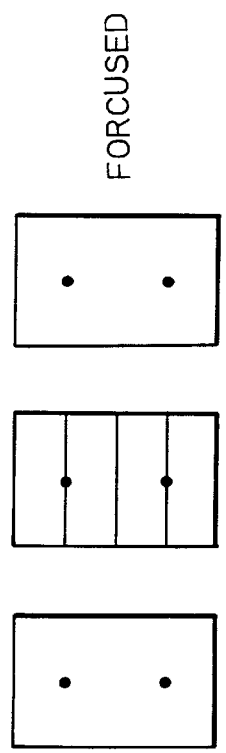
Figure 38C:
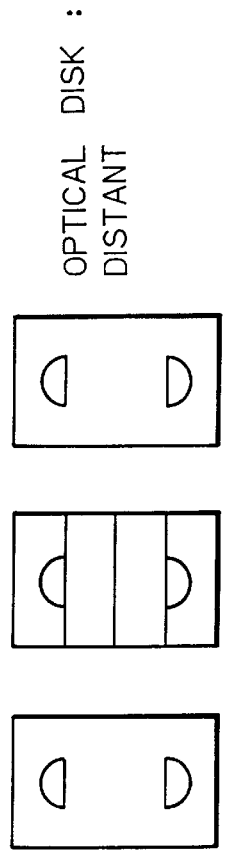

In general, the diffraction efficiency of the diffraction grating depends on its pitch and depth. Hereupon, its depth especially exerts an influence on the diffraction efficiency while its pitch dominates the polarization dependability of the diffraction efficiency. For instance, assuming that the depth is set so as to make the diffraction efficiency maximum per each pitch in the case of utilizing the Bragg diffraction, it is well-known that the relationship between the pitch and the diffraction efficiency is as shown in FIG. 36. It is apparent from FIG. 36 that, although the polarization dependability of the diffraction efficiency is small when the pitch is comparatively larger than the wavelength, the polarization thereof is large when the pitch is in the range of the wavelength to the half-wavelength.

In FIG. 36, regarding the diffraction grating having a pitch shown by $\Lambda_0$ (corresponding to incident angle; approx. 45°), the ratio of the diffraction efficiencies of the S-polarization and the P-polarization is large. Therefore, the diffraction grating can be utilized for detecting the magneto-optic signal. Hereupon, when the wavelength of the LD (semiconductor laser) is in the range of 0.6 μm–0.8 μm, it is appropriate to set the pitch to the value of 0.4 μm–0.6 μm.

Next, the mechanism of the diffraction in the case of forming the double diffraction grating by superposing two pieces of the high-density diffraction grating one upon another and causing both of the S- and P-polarized light rays to enter as the incident light rays is explained hereinafter, referring to FIG. 14.

Figure 14:
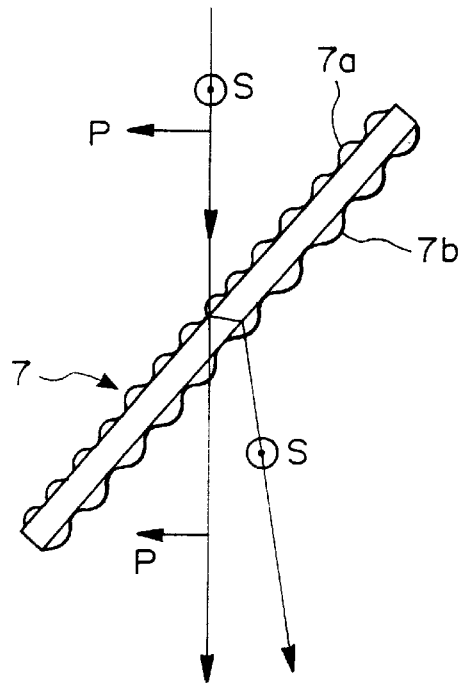
FIG. 14 is an outlined side view for explaining the double diffraction grating employed in the optical pick-up according to the present invention.

Regarding the high-density double diffraction grating 7, the P-polarized light rays almost entirely pass through the incident-side diffraction grating 7a while the S-polarized light rays are almost entirely diffracted as shown in FIG. 14, due to the aforementioned dependability of the polarized light rays. Similarly, even at the output-side diffraction grating 7b, the P-polarized light rays almost entirely pass therethrough while the S-polarized light rays are almost entirely diffrated at the grating.

Hereupon, assuming that two pieces of the ordinary low-density diffracted grating are employed, since both of the transmission light rays and the diffraction light rays are generated at the respective diffraction gratings, it follows that four light rays (2×2=4) are generated there. However, the mechanism of the high-density diffraction grating generates only two light rays.

In practice, the P-polarized light rays are slightly diffracted and the S-polarized light rays slightly pass through at the output-side diffraction grating. Consequently, although four light rays are generated there, the amounts of the above-mentioned two light rays are very small. Substantially, it is possible to neglect those light rays.

The so-called optical isolator can be constructed by combining a high-density diffraction grating consisting of the plural diffraction gratings having different pitches with a one-quarter-wavelength plate (λ/4 plate). The construction thereof is described referring to FIG. 1.

In FIG. 1, the polarized light rays are established so as to cause the P-polarized light rays to enter the high-density double diffraction grating 7 as the incident light rays.

And then, after the transmission light rays enters the λ/4 plate 8, the light rays are reflected on a reflection body 10 and the same pass through the λ/4 plate 8 and are S-polarized and enter the high-density double diffraction grating 7 as the incident light rays. In consequence, the light rays are diffracted in a direction different from that of the incident light rays due to the difference of the respective pitches thereof.

Therefore, the light rays can be separated. In such manner, the function of an optical isolator can be realized. Hereupon, it is needless to mention that, even in the case of employing the S-polarized light rays as the incident light rays, the light rays can be separated as is the case of the P-polarization. The detailed explanation thereof is omitted here.

In such situation, the above-mentioned isolator can be realized for the first time by employing the high-density double diffraction grating. In the conventional optical pick-up, the pick-up has a pitch not smaller than 1.7 μm on many occasions. Therefore, large polarization dependability cannot be desired, and thereby the function of the optical isolator cannot be realized.

In the optical pick-up employing the diffraction grating, ideally, it is desirable that the light rays emitted from the LD entirely pass through the diffraction grating on the forward route (without generating any diffracted light rays), and the light rays reflected on the recording medium (optical disk) are entirely diffracted at the diffraction grating also on the forward route (without generating any transmission light rays). However, in the conventional diffraction grating, since it has no function of the optical isolator as mentioned above, an almost-ideal optical pick-up could not be realized.

On the other hand, according to the construction of the present invention, since the diffraction grating and quarter wavelength plate fulfills the function as the optical isolator, it is possible to provide a high-efficiency optical pick-up.

Consequently, regarding the optical pick-up which is constructed such that the outgoing light rays emitted from the LD pass through the diffraction grating both on the forward route and the backward route, it is possible to make the optical pick-up employing the conventional diffraction grating more high-efficiency.

Next, the construction of the optical pick-up according to the first embodiment employing the above-mentioned double diffraction grating is described hereinafter.

Figure 2:
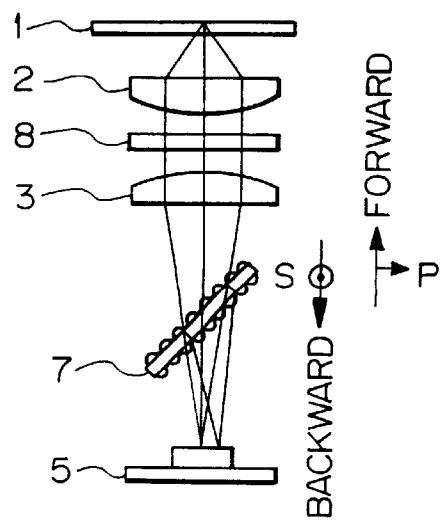
FIG. 2 is an outlined side elevational view of the first embodiments of an optical pick-up according to the present invention.

The present embodiment applies the doubled diffraction grating to the PU (pick-up) of Lee, et al. Namely, in the present embodiment, the optical pick-up is constructed such that the conventional diffraction grating is replaced by a double diffraction grating 7 as shown in FIG. 2 and a λ/4 plate 8 is disposed between an objective lens 2 and a collimating lens 3. At this time, the double diffraction grating 7 is disposed such that the polarization of LD5 turns out to be the P-polarization, and thereby the outgoing light rays emitted from the LD5 pass through the double diffraction grating 7. And further, as mentioned before, the pitch of the double diffraction grating 7 is established so as to make the incident angle almost 45°.

Hereupon, in the case of causing the aberration by making the incident angle large (45°), it is necessary to make the incident angle not more than 45° or to make thin the thickness of the double diffraction grating 7. The judgment is decided by the extent to which the spot focused on an optical disk 1 permits the aberration, and it may be allowed to obey the specification in accordance with the system of the optical disk 1.

In FIG. 2, the transmission light rays passing through the double diffraction grating 7 are collimated by the collimating lens 3. The collimated light rays are converted to the circularly-polarized light rays by use of the λ/4 plate 8. Hereupon, it is allowed to put the collimating lens 3 on the position opposite to that of the λ/4 plate 8. The collimated light rays are focused and radiated on the optical disk 1 by the objective lens 2. On this occasion, if the objective lens 2 is a finite system, the collimating lens 3 can be omitted.

The reflection light rays reflected on the optical disk 1 pass through the same route as that of the incident light rays, and are converted to the S-polarized light rays by the λ/4 plate 8 and diffracted by the doubled diffraction grating 7, and enter the PD (photo-diode) as the incident light rays.

The diffraction on the double diffraction grating 7 can be expressed by the equation (7).

$$\sin \theta_1 - \sin \theta_2 = \lambda(1/\Lambda_1 - 1/\Lambda_2) \tag{7}$$

Figure 3:
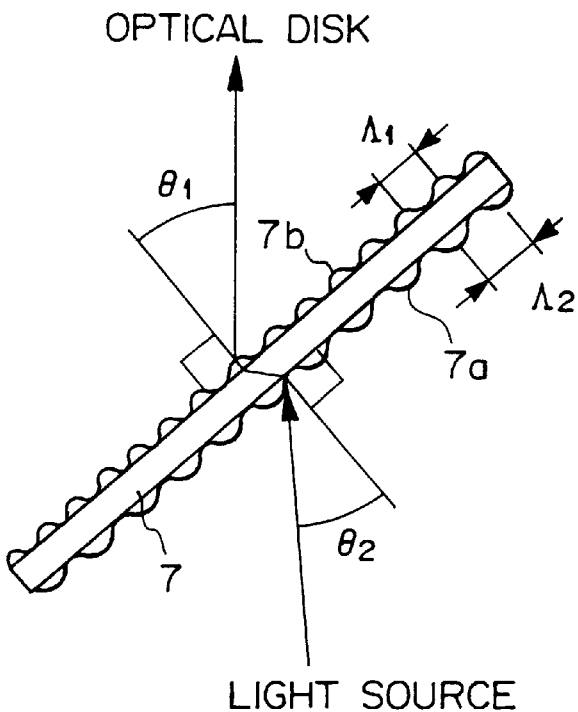
FIG. 3 is an outlined side elevational view of a double diffraction grating in the above-mentioned first embodiment.
Figure 4:
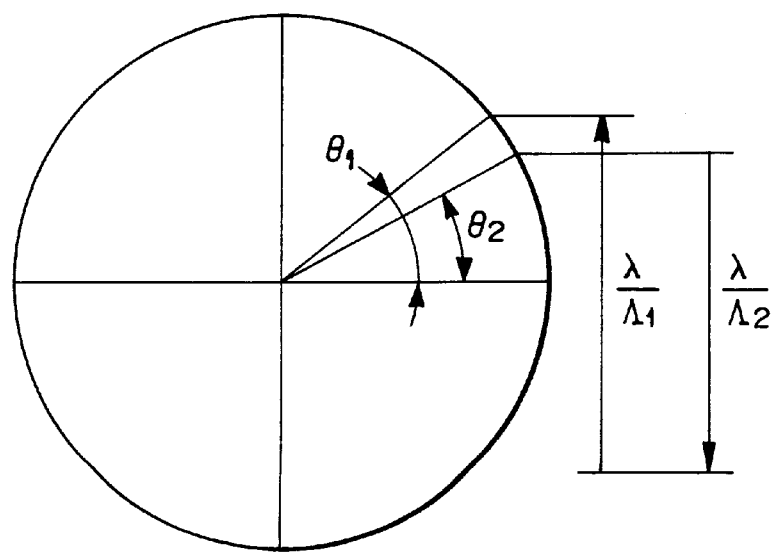
FIG. 4 is a diagram showing the diffracting operation of the above double diffraction grating in the first embodiment.

In the equation (7), $\Lambda 1$ and $\theta_1$ respectively represent the pitch and the incident angle of the double diffraction grating 7 on the incident position of the diffraction grating 7a at the light source side of the double diffraction grating 7, and $\Lambda_2$ and $\theta_2$ respectively represent the pitch and the outgoing angle of the double diffraction grating 7 on the emitting position of the diffraction grating 7b at the optical disk side of the double diffraction grating 7 as shown in FIG. 3, and $\lambda$ represents the wavelength. The diffraction diagram is shown in FIG. 4. Hereupon, the respective pitches of the front and rear-surfaces diffraction gratings of the double diffraction grating are made equal to each other, and thereby the manufacturing of the double differential grating 7 can be made very simple.

And further, the angle formed by the outgoing light rays emitted from the LD5 and the diffraction light rays diffracted on the double diffraction grating 7 is $\theta_1-\theta_2$. Since the angle $\theta_1$ is an initial set angle of the doubled diffraction grating 7, the angle $\theta_2$ can be set by suitably setting $\theta_1$ and $\Lambda_1$; and $\Lambda_2$.

In such a situation, since the light rays enter the diffraction grating as the incident light rays perpendicular thereto conventionally, it is necessary to execute charping in order to cause the astigmatism. However, in the present invention, since the light rays enter the diffraction grating as the incident light rays with a certain angle (~45°), the astigmatism can be caused without executing any charping. Since the extent of the charping is comparatively small, in case that it is necessary to execute a large extent of charping due to the demand on the designing of the respective optical disk systems, it turns out to be possible to obtain a desired focus signal by executing the charping on at least either one of the double diffraction grating and thereby causing an optional astigmatism as mentioned above. Furthermore, the track signal and the recording signal can be detected by the same method as mentioned before.

In such way, according to the present invention, an optional astigmatism can be caused by executing the charping on at least either one of the double diffraction grating, and thereby a desired designing can be done.

Next, a second embodiment of the present invention is explained.

Figure 5:
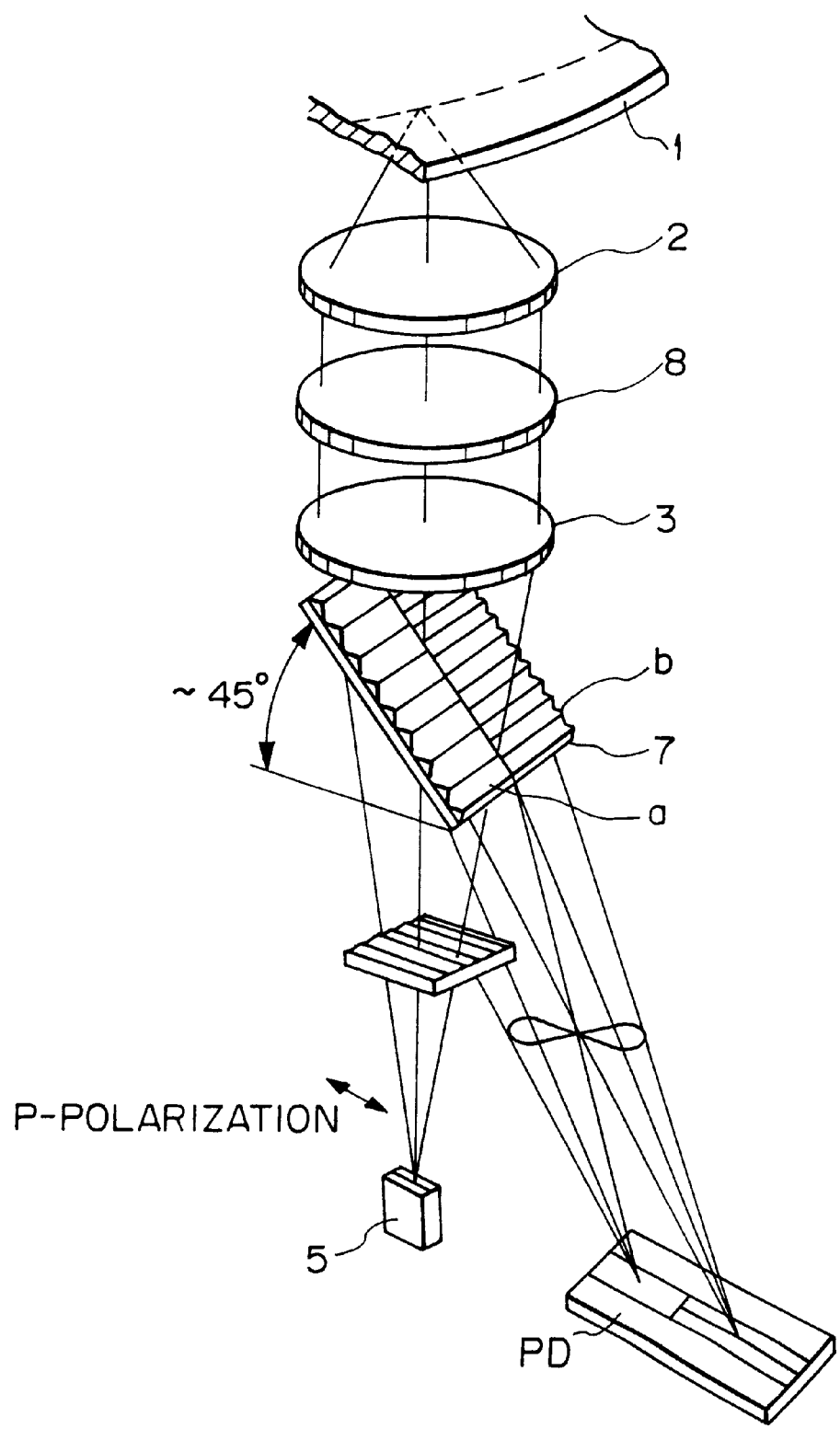
FIG. 5 is an outlined perspective view showing the second embodiment of the above optical pick-up according to the present invention.

The diffraction grating of the Sharp-PU firstly put to practical use as the optical pick-up employing the diffraction grating can be replaced by the above-mentioned double diffraction grating in order to improve the light rays utilizing efficiency. Namely, in the present embodiment, the diffraction grating of the PU made by Sharp is replaced by the double diffraction grating 7 and the $\lambda/4$ plate 8 is disposed between the objective lens 2 and the collimating lens 3, as shown in FIG. 5.

The doubled diffraction grating 7 is constructed with a divided portion a and another divided portion b, the pitches of which are different from each other, as is the case of the Sharp-PU.

Figure 6:
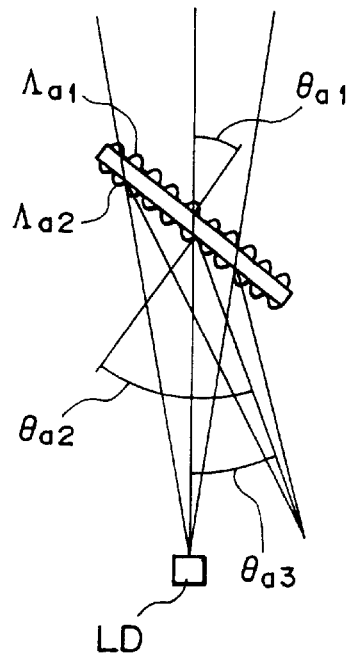
FIG. 6 is an outlined side elevational view of the double diffraction grating in the second embodiment showing incident angle and pitch at a dividing portion a of the above double diffraction grating in the second embodiment.
Figure 7:
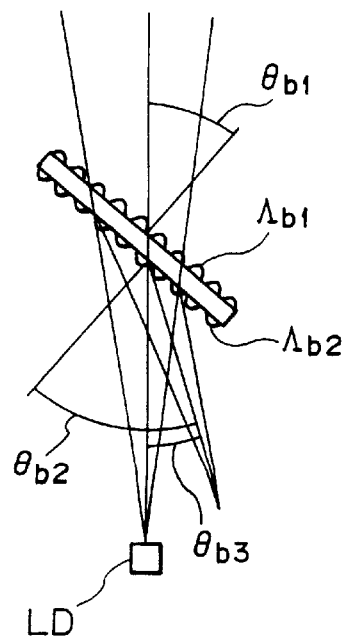
FIG. 7 is an outlined side elevational view of the double diffraction grating in the second embodiment showing incident angle and pitch at another dividing portion b of the above double diffraction grating in the second embodiment.

FIGS. 6 and 7 are explanatory diagrams illustrating the respective incident angles and pitches at the divided portion a and the other divided portion b. Concerning the divided portion a, respective factors can be expressed by the following three equations:

$$\sin \theta_{a1} - \sin \theta_{a2} = \lambda(1/\Lambda_{a1} - 1/\Lambda_{a2}) \tag{8}$$

$$\theta_{a3} = \theta_{a2} - \theta_{a1} \tag{9}$$

$$\sin \theta_{a3} = \lambda/\Lambda_a \tag{10}$$

Hereupon, $\lambda$ is the waveform, $\Lambda_{a1}$ and $\theta_{a1}$ the pitch and incident angle of the diffraction grating lat the side of the optical disk of the idvided portion a, $\Lambda_{a2}$ and $\theta_{a2}$ the pitch and incident angle of the diffraction grating at the side of the light source of the divided portion a, and $\theta_{a3}$ the angle formed by the difference between the diffracted light rays and the outgoing light rays emitted from the light source.

The value of the wavelength "$\lambda$" can be selected suitably. "$\theta_{a1}$" can be selected to the value of almost 45°. "$\Lambda_a$" can be determined by pursuing the light rays. In consequence, "$\theta_{a3}$" can be obtained in accordance with the equation (10), and further "$\theta_{a2}$" can be obtained from $\theta_{a1}$ and $\theta_{a3}$ in accordance with the equation (9).

Furthermore, "$\Lambda_{a1}$" can be obtained from $\theta_{a1}$ and $\lambda$ by satisfying the Bragg Condition. Finally, $\Lambda_{a2}$ can be obtained in accordance with the equation (8).

In a similar way, the following respective equations (11), (12), and (13) can be established, even at the divided portion b.

$$\sin \theta_{b1} - \sin \theta_{b2} = \lambda(1/\Lambda_{b1} - 1/\theta_{b2}) \tag{11}$$

$$\theta_{b3} = \theta_{b2} - \theta_{b1} \tag{12}$$

$$\sin \theta_{b3} = \lambda/\Lambda_b \tag{13}$$

Hereupon, $\lambda$ is the waveform, $\Lambda_{b1}$ and $\theta_{b1}$ the pitch and incident angle of the diffraction grating at the side of the optical disk of the divided portion b, $\Lambda_{b2}$ and $\theta_{b2}$ the pitch and incident angle of the diffraction grating at the side of the light source of the divided portion b, and $\theta_{b3}$ the angle formed by the difference between the direction of the diffracted light rays and that of the outgoing light rays emitted from the light source.

Furthermore, $\Lambda_b$ represents the pitch of the divided portion in the case of employing the diffraction grating constructed with only one conventional grating made by Sharp.

And further, the respective specifications (factors) can be obtained in the same way as that of the divided portion a.

Hereupon, although the respective values; $\Lambda_{a1}$, $\Lambda_{a2}$, $\Lambda_{b1}$ and $\Lambda_{b2}$ are explained as different values, it can be allowed to employ the construction of diffraction grating in which the values of $\Lambda_{a1}$ and $\Lambda_{b1}$ are same or the values of $\Lambda_{a2}$ and $\Lambda_{b2}$ are same, in other words, to employ the construction of diffraction grating in which either one of the double diffraction grating 7 is not divided from the other.

It signifies that, if at least one surface of the double diffraction grating is divided, the diffracted light rays are also divided and thereby the function thereof can be attained.

In the case of dividing only one surface of the double diffraction grating, the diffraction grating can be profitably manufactured more easily.

Next, the third embodiment of the present invention is explained hereinafter.

In the present embodiment, the conventional diffraction grating of the PU made by Matsushita in accordance with the astigmatism method is replaced by the above-mentioned double diffraction grating, and thereby, the efficiency of the light rays utilization can be improved and the diffraction grating can be employed on both of the forward and backward routes of the light rays. Therefore, it is possible to realize the diffraction grating smaller that the conventional one made by Matsushita.

Figure 8A:
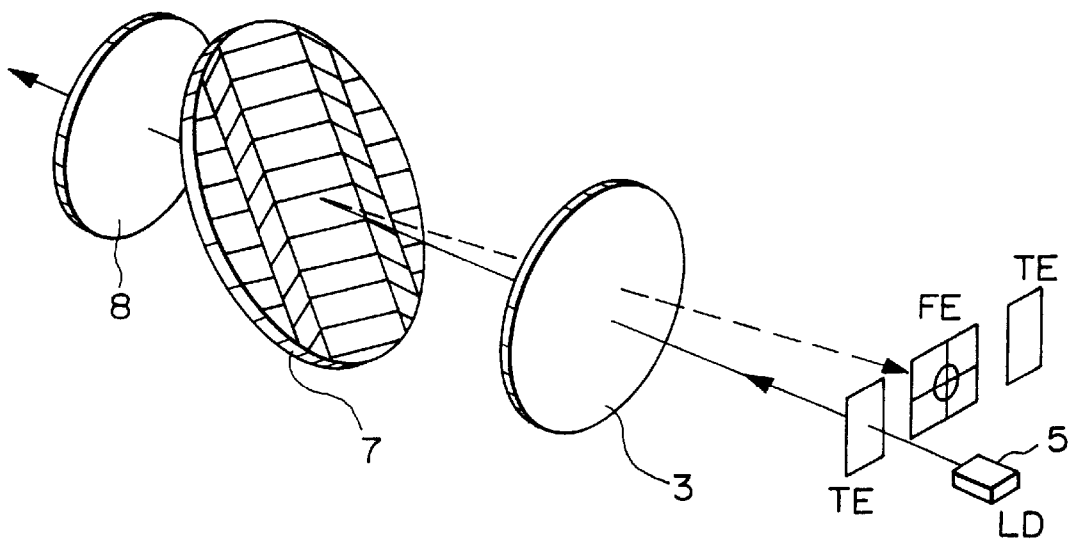
FIG. 8a is an outlined perspective view showing the third embodiment of the above optical pick-up according to the present invention.
Figure 8B:
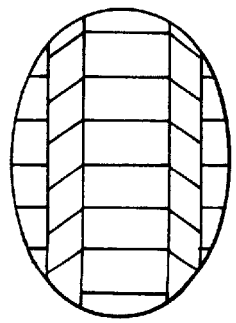
FIGS. 8b and 8c are outlined views showing the distribution of the double diffraction grating in the third embodiment.
Figure 8C:
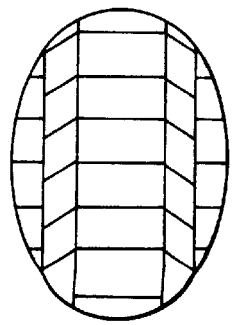

Namely, in the present embodiment, the diffraction grating is constructed such that the conventional diffraction grating of the PU is replaced by the double diffraction grating 7, the $\lambda/4$ plate 8 is disposed between the objective lens 2 and the collimating lens 3, and the LD5 as the light source is disposed instead of the PD employed as the recording signal (Rf), as shown in FIG. 8.

In FIG. 8, the output light rays emitted from the LD5 are collimated by the collimating lens. The collimated light rays enter the double diffraction grating 7 as the incident light rays and are converted to the circularily-polarized light rays. Hereupon, it is allowed to change the positional order of the collimating lens 3, the λ/4 plate 8, and the double diffraction grating 7.

The collimated light rays are focused and radiated by the objective lens 2 on the optical disk 1. Hereupon, in case that the objective lens 2 is the definite system, the collimating lens 3 can be omitted. The reflection light rays reflected on the optical disk 1 pass through the same route as that of the incident light rays and are converted to the S-polarized light rays by the λ/4 plate 8, and thereby the converted light rays are diffracted by the double diffraction gating 7 and thereafter enter the PD (photo-diode).

Although the present embodiment does not have any PD employed for the recording signal (Rf), the signal Rf can be obtained from the total of the output of all other PDs.

Figure 9A:
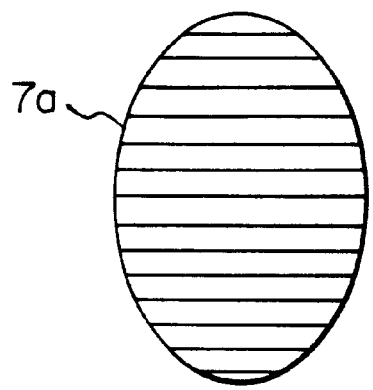
FIGS. 9a and 9b are another outlined views showing the distribution of the double diffraction grating in the third embodiment.
Figure 9B:
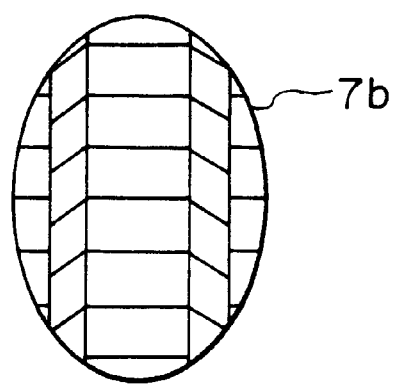

And further, regarding the double diffraction grating 7 according to the present embodiment, as shown in FIG. 9, it may be allowed that either one of the diffraction grating 7a at the side of the light source and the other diffraction grating 7b at the side of the optical disk is the diffraction grating without any distribution. FIG. 9 FIG. 9 shows the case of the diffraction grating 7a.

Figure 10A:
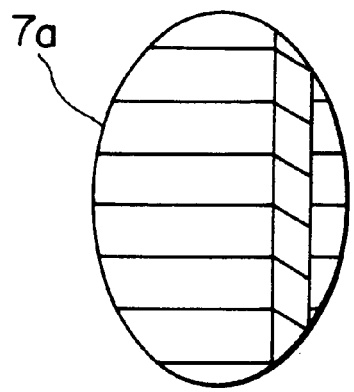
FIGS. 10a and 10b are still another outlined views showing the distribution of the double diffraction grating in the third embodiment.
Figure 10B:
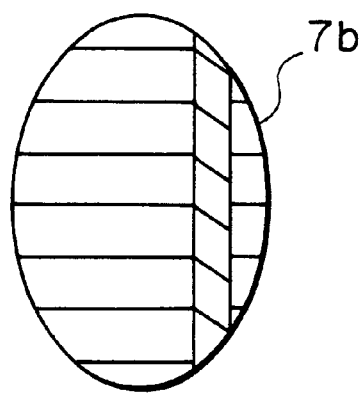

Such separation of the diffracted light rays per each area depends on the fact that it may be allowed that the distribution thereof is formed on at least either one of the front and rear surfaces of the double diffraction grating 7. Similarly, as shown in FIG. 10, the shape of the double diffraction grating 7 according to the present embodiment viewed from the light source is same as that of the grating 7 viewed from the optical disk while the pitches thereof are different from each other.

Nevertheless, the diffraction grating can exert same function when both of the grating's half portions are superposed upon another.

As mentioned heretofore, by employing the double diffraction grating, the respective half portions can be installed on both of the forward and backward routes of the LD light rays, and further it is possible to provide the PU more small-sized than the conventional PU made by Matsushita.

Needless to mention, it is also possible to adopt the construction same as the conventional construction of Matsushita.

Namely, on this occasion, it may be allowed to adopt the construction excluding the LD 5 in FIG. 8.

However, since small(slight) amount of the transmitted light rays exist in such construction, the PD for Rf is disposed instead of the LD5 and the signal from the PD is added to the Rf signal, and thereby the signal of higher S/N can be obtained.

Next, the fourth embodiment of the present invention is explained hereinafter.

The efficiency of utilizing the light rays can be improved by replacing the conventional diffraction grating made by NEC by the above-mentioned double diffraction.

Figure 11:
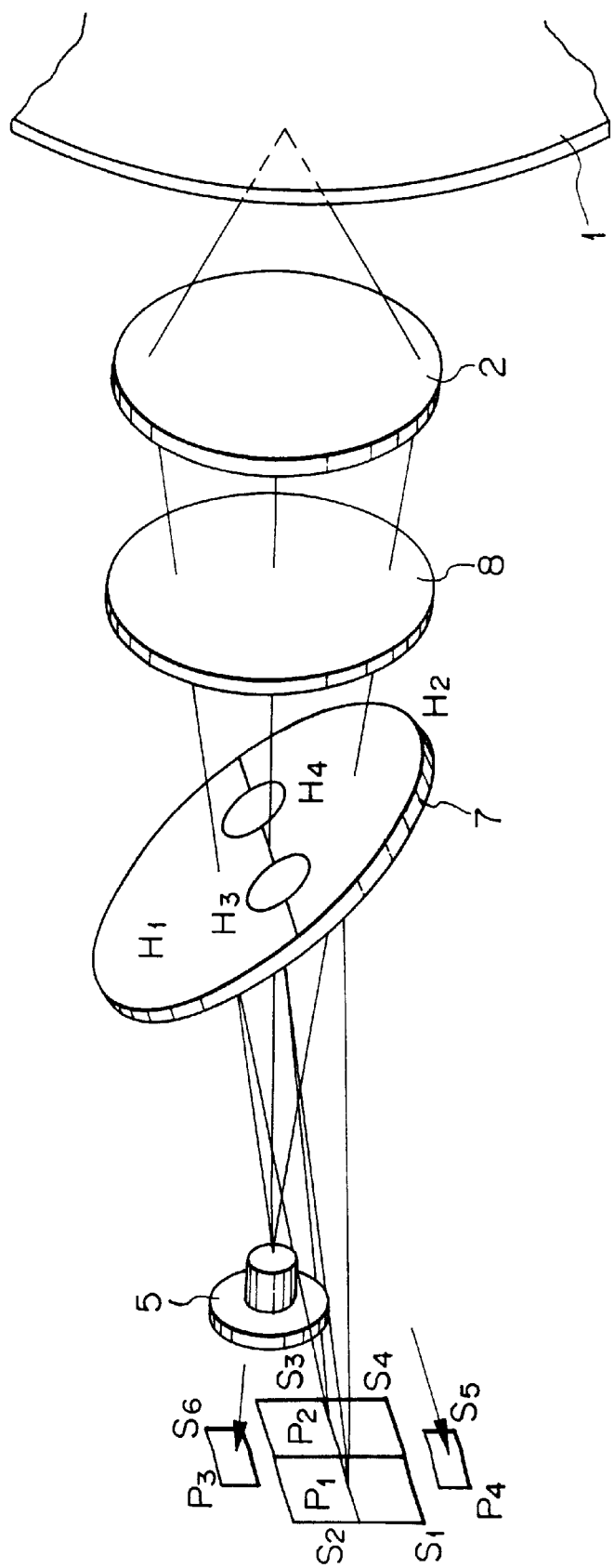
FIG. 11 is an outlined perspective view showing the fourth embodiment of the above optical pick-up according to the present invention.

In other words, according to the present embodiment, the diffraction grating system is constructed such that the conventional diffraction grating is replaced by the double diffraction grating 7, the λ/4 plate 8 is disposed between the objective lens 2 and the collimating lens, and the LD5 is disposed as the light source instead of the PD for the recording signal (Rf), as shown in FIG. 11.

In FIG. 11, the collimated light rays enter the doble diffraction grating 7 as the incident light rays, and are converted to the circularly polarized light rays by the λ/4 plate 8.

At this time, it may be permitted to collimate the outgoing light rays emitted from the LD5 by use of the collimating lens. Hereupon, it may be also permitted to change the positional order of the collimating lens, the λ/4 plate 8, and the double diffraction grating 7.

The light rays converted to the circularly polarized light rays are focused and radiated onto the optical disk, by use of the objective lens 2. Hereupon, in case that the objective lens 2 is a definite system, the collimating lens 3 can be omitted. The reflection light rays reflected on the optical disk 1 pass through the same route as that of the incident light rays and are converted to S-polarized light rays by the λ/4 plated 8, and thereby are diffracted by the double diffraction grating 7 and enter the PD (Photo Diode) as the incident light rays.

In the present embodiment, the focus signal can be obtained by the double-knife-edge method in accordance with the below equation (14), the track signal by the push-pull method in accordance with the below equation (15), and the Rf signal by the total light intensity(amount) in accordance with the below equation (16).

$$Fo=(S_1+S_3)-(S_2+S_4) \tag{14}$$

$$Tr=S_5-S_6 \tag{15}$$

$$Rf=S_1+S_2+S_3+S_4+S_5+S_6 \tag{16}$$

And further, according to the present embodiment, it may be allowed that, regarding the double diffraction grating 7, either one of the diffraction grating at the light source side and the other diffraction grating at the optical disk side has no distribution.

The separation of the diffracted light rays per each area depends on the fact that the distribution thereof is allowed to be formed on at least either one of the front and rear surfaces of the double diffraction grating. Similarly, the shape of the double diffraction grating 7 according to the present embodiment viewed from the light source is same as that of the grating 7 viewed from the optical disk while the pitches thereof are different from each other.

Nevertheless, the diffraction grating can exert same function when both of the grating's half portions are superposed upon another.

In such way, according to the second through fourth embodiments of the present invention, the conventional area-dividing type diffraction grating is constructed with the double diffraction grating, and thereby the efficiency of utilizing the light rays is improved and the consumed light amount(intensity) of the light source (LD) becomes small and as the result the cost can be decreased.

Hereupon, as is apparent from the fact that the conventional diffraction grating can be employed as a light separator, in the conventional diffraction grating, the diffraction angle thereof changes in accordance with the wavelength as a matter of course. For this reason, in the case of employing the conventional diffraction grating as a light pick-up, the charactaristic thereof makes change of the spot on the PD and thereby the detection of the signal becomes unstable. On the contrary, the above-mentioned double diffraction grating has a functional effect of setting off the spot variations from each other.

Namely, according to the present invention, as is apparent from the equation (7), when the values $\Lambda_1$ and $\Lambda_2$ are approximately equal to each other, the coefficient portion to be multiplied by the right side wavelength λ approaches to zero("0"). Consequently, the variation of the entire portion of the right side decreases in accordance with the variation of the wavelength, and the variation of the light-outputting angle (diffraction angle) $\theta_2$ from the double diffraction grating at the left side decreases also. Especially, in the equation (7), in the case of $\Lambda_1=\Lambda_2$ the double diffraction grating is not influenced at all by the variation of the wavelength $\lambda$. This is an important functional effect of the doubled diffraction grating.

Figure 12:
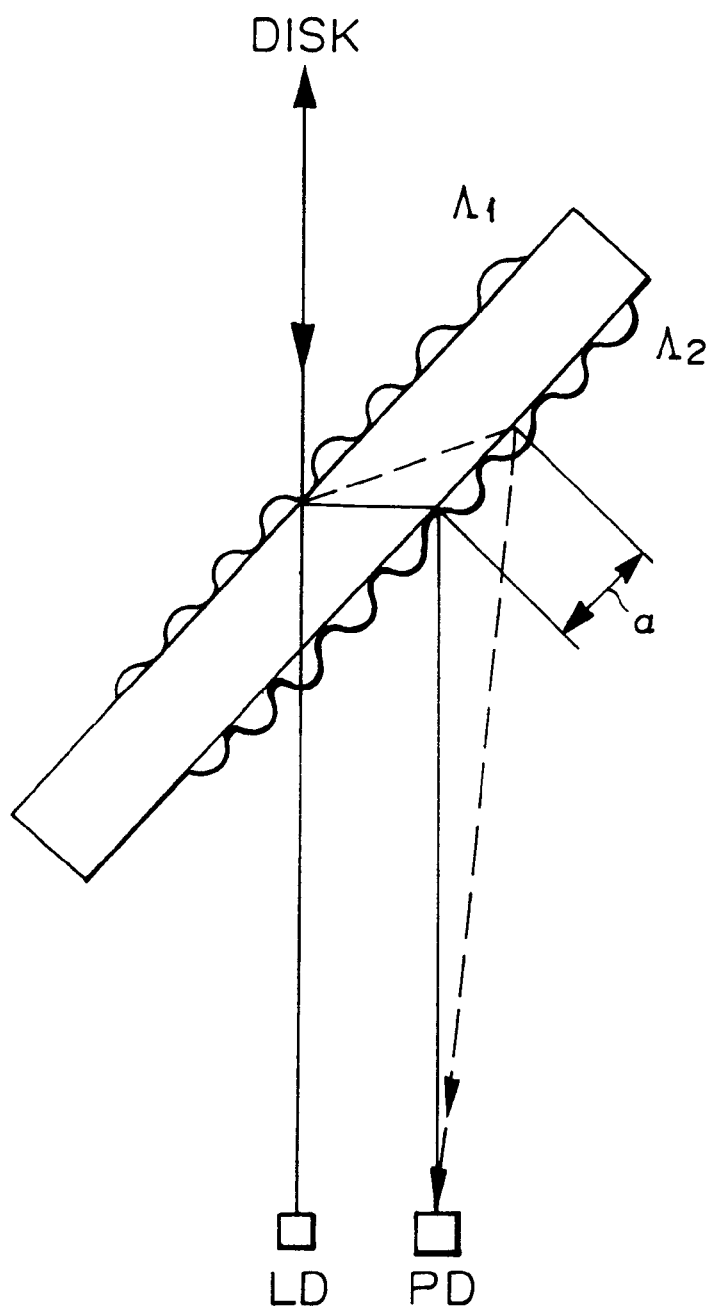
FIG. 12 is an outlined view showing the relationship of the distance between the respective gratings and the optical axis in the above-mentioned double diffraction grating.

However, in the actual double diffraction grating, since there exists a considerable distance between the adjacent diffraction gratings, the above-mentioned functional effect of this doubled diffraction grating does not appear until the light rays coming back from the optical disk are diffracted on the diffraction grating at the side of the optical disk and then arrive at the diffraction grating at the side of the light source as shown in FIG. 12, and thereby the optical axis shifts slightly.

In order ot solve such troublesome matter as mentioned above, it may be preferable to set the pitch of the diffraction grating at the side of the light source slightly smaller than that of the diffraction grating at the side of the optical disk. As shown in FIG. 12, when the pitch of the diffraction grating at the side of the light source is smaller than that of the diffraction grating at the side of the optical disk, the diffraction angle differs from the other(varies) depending on the variation of the wavelength, and thereby there arises a functional effect of bringing back the optical axis.

Consequently, the pitch of the diffraction grating at the light source side is set smaller than that of the diffraction grating at the optical disk side, and thereby the spot on the PD hardly changes for the wavelength change due to the ambient temperature change and the signal can be detected stably.

On the other hand, the conventional diffraction grating is disposed perpendicularly to the optical axis, while the double diffraction grating according to the embodiment of the present invention is constructed such that the diffraction grating is disposed obliquely in relation to the optical axis and let the LD light rays pass therethrough. For this reason, the transmission light rays transmitted through the double diffraction grating may cause the astigmatism.

In order to avoid such astigmatism occurrence, it is preferable to make thin the thickness of the parallel substrate forming the double diffraction grating (not thicker than several 10 $\mu$m).

However, there exists an important subject to be solved in connection with the problem of namufacturing such double diffraction grating.

Hereupon, as shown in FIG. 13, in the embodiment of the present invention, a diffraction grating 7a and another diffraction gratin 7b constructing a double diffraction grating are formed on the respective slanted surface of two prisms 70A and 70B, and those prisms 70A and 70B are bonded to each other and the bonded portion forms the double diffraction grating 7. In such manner, the distance(thickness) of the double diffraction grating 7 can be made very small by employing thin spacer 70C as shown in FIG. 13a.

Furthermore, the spacer 70C can be allowed to neglect according to circumstances.

In this embodiment, since the refractive index of the prisms 70A and 70B is larger than that of the air, the diffraction angle in the prisms 70A and 70B becomes smaller than that in the air.

As a result, the top angle $\alpha$ of the respective prisms 70A and 70B turns out to be smaller than the incident angle.

For instance, assuming that the incident angle is 45° in the case of employing a flat board parallel with the substrate of the double diffraction grating, the top-angle $\alpha$ of the respective prisms 70A and 70B corresponding thereto becomes almost 30° as shown in FIG. 13b.

As mentioned heretofore, in the present embodiment, since the double diffraction grating is constructed by forming each diffraction grating on the respective slanted surfaces of two prisms and bonding each diffraction grating to another, the distance between the respective diffraction gratings can be made small easily.

Furthermore, any aberration does not appear on the spot focused on the optical disk. Consequently, it is possible to provide an optical pick-up having stable recording and reproducing characteristics.

According to this first group of the present invention, it is possible to cause the outgoing light rays emitted from the light source to pass through the diffraction by almost 90%, and further to cause the reflection light rays reflected on the optical disk to enter the PD by almost 85–90%, and, in consequence, the efficiency of utilizing the light rays can be largely improved. Furthermore, it may be possible to detect the recording signal, the focus error signal, and the track error signal.

DESCRIPTION OF THE FIFTH THROUGH TWELFTH EMBODIMENTS

Next, the second group of the present invention is described hereinafter, in relation to the fifth through twelfth embodiments referring to FIGS. 15–27.

Figure 15:
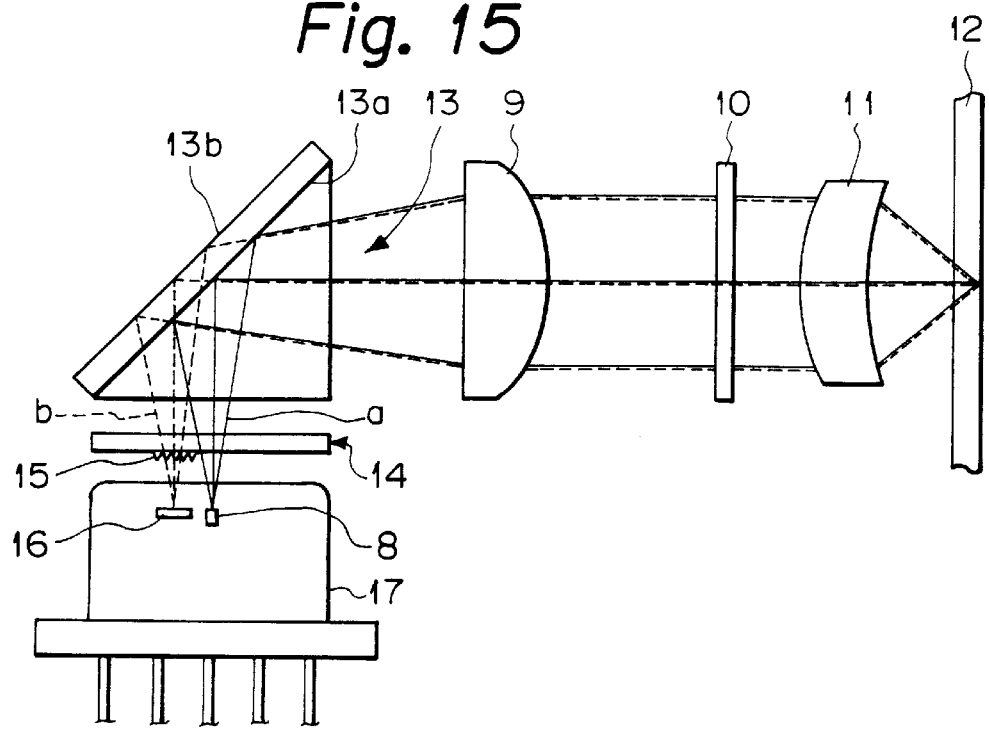
FIG. 15 is an optical route diagram showing an overall construction of the fifth embodiment of an optical head according to the present invention.

First of all, the fifth embodiment of the present invention is described, referring to FIG. 15 and FIG. 16. FIG. 15 is a construction view for explaining an overall construction of the optical head. The outgoing light rays a emitted from a semiconductor laser 8 employed as the laser light source are converted to parallel light rays by a collimating lens 9, and focused by an objective lens 11 through a ¼(quarter)-wavelength plate 10. And then, the operations of recording, reproducing, and erasing the information are performed by radiating the focused light rays onto the surface of the optical disk 12 employed as the optical information recording medium. In the present embodiment, a polarizing film 13a is formed on the entire surface of the optical route between the semiconductor laser 8 and the objective lens 11 in such the optical head, and a PBS prism (polarizing beam splitter) prism 13 employed as the prism having a reflecting film 13b formed thereon is disposed on the surface opposing to the surface of the polarizing film 13a with a constant plate thickness.

And further, a transmission-type diffraction grating 14 having a diffraction grating 15 is disposed on a position between the PBS prism 13 and the semiconductor laser 8. The diffraction laser 15 is formed on a part of a substrate 14a, and the same is disposed so as to guide only reflection light rays b to a light receiving element 16 on an optical route on which the output light rays a emitted from the semiconductor laser 8 do not pass through and the reflection light rays b reflected on the optical disk 12 pass through the PHS prism 13.

Figure 16A:
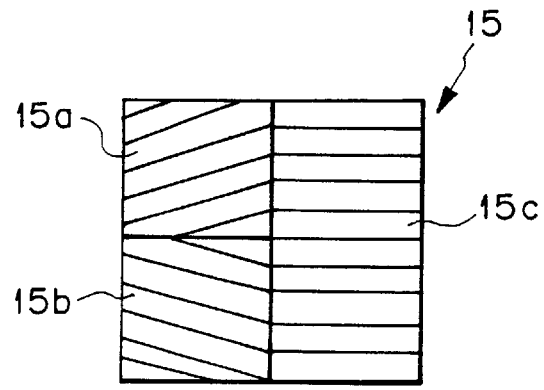
FIG. 16a is a front view showing the area-divided diffraction grating.

FIG. 16a is a diagram showing the grating shape of the diffraction grating 15. The area of the diffraction grating is divided into three areas; 15a–15c, in order to detecting the focus error signal Fe, and the track error signal Te.

Figure 16B:
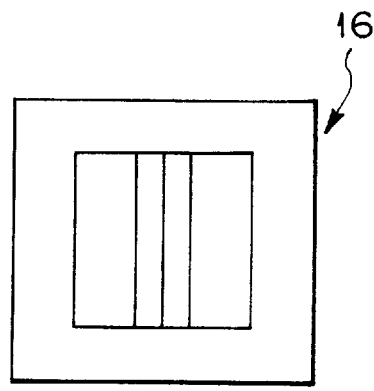
FIG. 16b is a front view showing the multi-divided light receiving element.

The diffraction light rays from the diffraction grating and the transmission light rays are received by the photo-diode of the shape as shown in FIG. 16b.

And further, the light-receiving element 16 is also divided into multiple-areas (in the present embodiment, four areas) in accordance with the number of the divided areas of the diffraction grating 15. As mentioned above, regarding the dividing status of the diffraction grating 15 and the light-receiving element 16, there exist various methods of dividing the areas in accordance with the method of detecting the signal. The semiconductor laser 8 and the light-receiving element 16 are accommodated in a same package 17 (TO–5, etc.).

In such construction as mentioned above, the linearly-polarized outgoing light rays a emitted from the semiconductor laser 8 are reflected on the polarizing film 13a of the PBS prism 13, and thereafter the reflected light rays are converted to parallel light rays by the collimating lens 9, and further the same are circularly polarized by the ¼(quarter)-wavelength plate 10, focused by the objective lens 11, and radiated on the surface of the optical disk 12. In such manner as mentioned above, the information is recorded and erased.

Furthermore, the reflection light rays b reflected on the optical disk 12 pass through the reverse optical route to that of the incident light rays, and the same reflection light rays are converted to the linearly-polarized light rays perpendicular to the outgoing transmission light rays a by the ¼(quarter)-wave-length plate 10. The light rays further pass through the polarized film 13a of the PBS prism 13 and are guided to the diffraction grating 15 of the transmission-type diffraction element 14 after being reflected on the reflecting film 13b. Since the diffraction grating 15 is divided into the plural areas; 15a–15c, the reflected light rays b are divided into those plural areas and detected by the light-receiving element 16. In such manner, the information reproducing signal Rf, the focus error signal Fe, and the track error signal Tr can be detected.

As described above, the present embodiment provides an optical isolator constructed such that the diffraction grating 15 of the transmission-type diffraction element 14 is disposed in the optical route on which the outgoing light rays a emitted from the semiconductor laser 8 do not pass through and further the reflection light rays b reflected on the optical disk 12 pass through the PBS prism 13, and only the reflected light rays b are guided to the light-receiving element 16. In such construction, the optical loss such that the outgoing transmitted light rays a to be radiated on the optical disk 12 lose the light amount(intensity) thereof or a part of the light amount(intensity) of the reflection light rays b reflected on the surface of the disk is not guided at all to the light-receiving element 16 as is the conventional case can be eliminated completely.

Furthermore, the efficiency of utilizing the light rays can be enhanced compared with the conventional optical head.

Since the optical loss can be decreased and the light utilizing efficiency can be enhanced, it is possible to use the laser light source of low power and thereby to realize the optical head of low cost. And further, since the semiconductor laser 8 and the light-receiving element 16 are unitarily accommodated in the package 17, the optical head can be small-sized, and furthermore stable operation can be done against a change by the passage of time.

Figure 17:
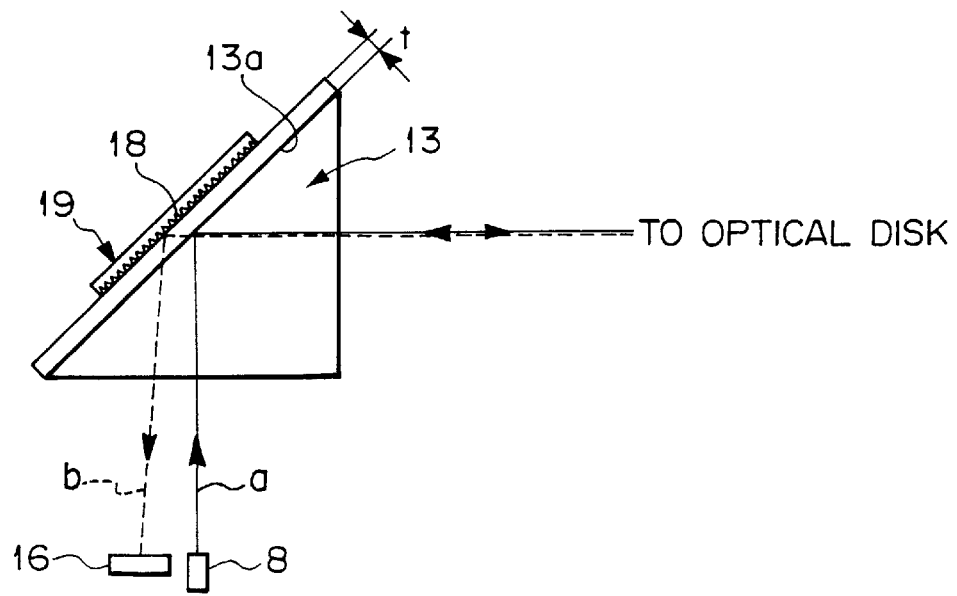
FIG. 17 is an optical route diagram showing a partial construction of the sixth embodiment of an optical head according to the present invention.
Figure 18:
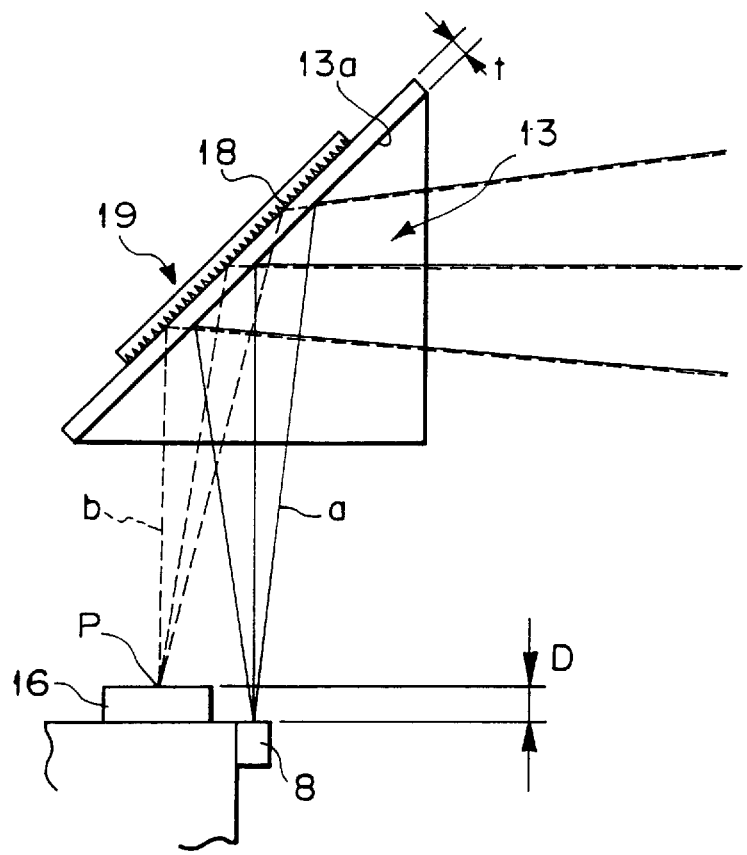
FIG. 18 is an optical route diagram showing the positional relationship of the light rays reflected, respectively, on the polarizing film (membrane) surface and the grating surface.

Next, the sixth embodiment is explained referring to FIG. 17 and FIG. 18. The explanation of the same portion as that of the fifth embodiment is omitted. Same reference numeral is attached to the same portion.

In the afore-mentioned fifth embodiment of the present invention, the transmission-type diffraction element 14 is employed. However, the present invention constructs the optical head with the reflection-type diffraction element 19 instead of the transmission-type diffraction element. Namely, as shown in FIG. 17, the PBS prism 13 on which the polarizing film 13a is formed entirely is disposed on the optical route situated between the semiconductor laser 8 and the objective lens 11. And further, the reflection-type diffraction element 19 having the diffraction grating 18 is unitarily provided by bonding it with the adhensive agents on the surface opposing with a constant thickness (plate thickness)t to the surface on which the polarizing film 13a of the PBS prism 13.

In such construction, the reflection light rays b reflected on the optical disk 12 pass through the polarizing film 13a in the PBS prism 13 and are diffracted by the diffraction grating 18 in the reflection-type diffraction element 19 disposed on the opposite surface thereof, and all of the diffracted light rays are guided to the light-receiving element 16.

Even in the case of this reflection-type diffraction element 19, it is possible to perform easily the detection of various signals by dividing the area as is the case of the transmission-type diffraction element 14. Consequently, since the diffraction grating 18 turns out to be disposed on the opposite surface of the polarizing film 13a viewing from the side of the output emission light rays by employing the reflection-type diffraction element 19, and the output light rays a emitted from the semiconductor laser 8 do not pass through the diffraction grating 18 and are directed to the optical disk 12, the plate thickness(gap) t formed between the surface of the polarizing film 13a and the other surface at the side of the diffraction grating 18 can be made small(thin). Therefore, the plate thickness t can have a variation width(margin) of a certain extent, and thereby the position P of the focusing point on the surface of the light-receiving element 16 can be determined(set) comparatively optionally in accordance with the thickness D of the light-receiving substrate. Furthermore, since the outgoing light rays a emitted from the semiconductor laser 8 and directed to the optical disk 12 do not pass through the substrate as in the case of the substrate 14a of aforementioned transmission-type diffraction element 14, the outgoing emission light rays a do not show any fluctuation at the time of assembling and adjusting the diffraction grating 18 and thereby the operation of assembling and adjusting the same can be done stably, compared with the case of the transmission-type diffraction element. And further, even in the case of the present embodiment, the efficiency of utilizing the light rays can be enhanced, and the optical head of low cost can be realized.

Figure 19:
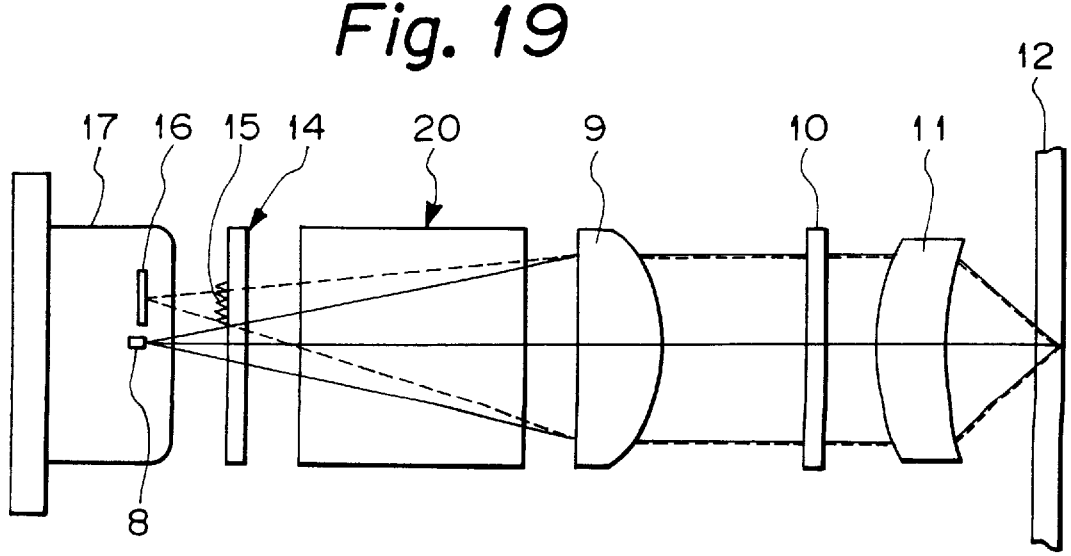
FIG. 19 is an optical route diagram showing an overall construction of the seventh embodiment of an optical head according to the present invention.
Figure 20A:
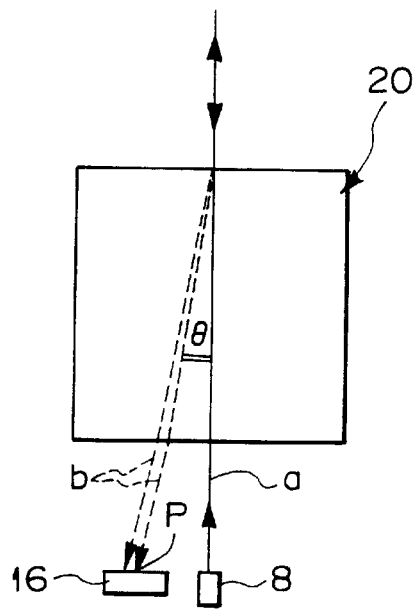
FIG. 20a is an optical route diagram showing the state of separating the optical route by use of the Wollaston prism.
Figure 20B:
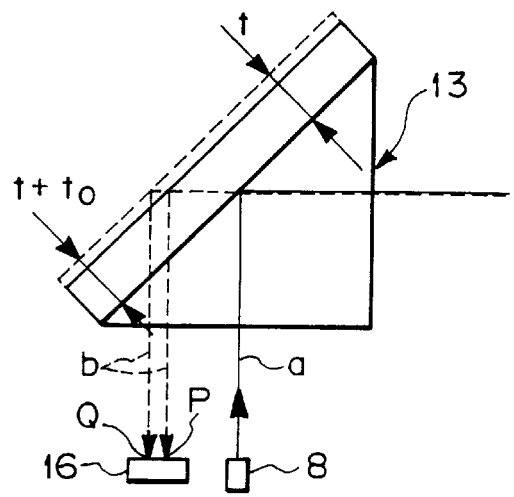
FIG. 20b is an optical route diagram showing the state of separating the optical route by use of the BS prism.
Figure 21:
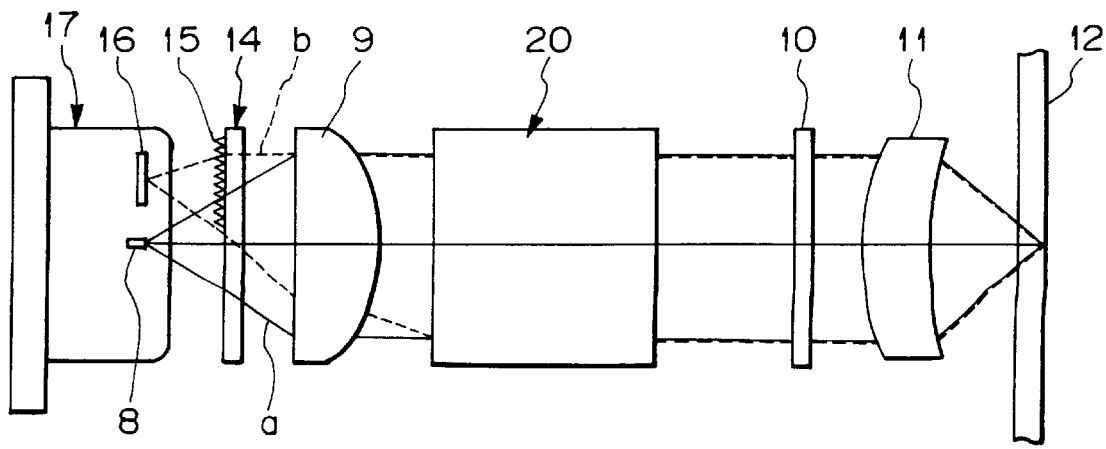
FIG. 21 is an optical route diagram showing the construciton of an optical head in the case of distributing the polarization separating element in the parallel optical route.

Next, the seventh embodiment of the present invention is explained referring to FIGS. 19 through 21. The explanation of the same portion as that of the fifth and sixth embodiments is omitted, and same reference numeral is attached to the same portion.

Although the PBS prism 13 is employed in the afore-mentioned fifth and sixth embodiments, the diffraction element is constructed with a polarizing/separating element employed instead of the PBS prism. Namely, as shown in FIG. 19, a Wollaston prism 20 serving as the polarizing/separation element having a polarizing/separation function with the emission angle different from the other in accordance with the polarizing direction (a function of separating the angle for the P-polarization and the S-polarization) is disposed on the optical route between the semiconductor laser 8 and the objective lens 11. Furthermore, the transmission-type diffraction element 14 having the diffraction grating 15 for guiding only the reflection light rays b to the light-receiving element 16 is disposed on the optical route in which the output emission light rays a emitted from the semiconductor laser 8 do not pass through and the reflection light rays b reflected on the optical disk pass through the Wollaston prism 20.

In general, the Wollaston prism 20 considerably consumes the light rays and further the accuracy of the separation angle is high, compared with the other prism.

The reason of the separation angle accuracy rising is described hereinafter referring to FIGS. 20a and 20b in comparison with the case of the PBS prism 13.

Firstly, regarding the PBS prism 13 shown in FIG. 20b, the separation of the reflection light rays b from the outgoing emission light rays a is done by adjusting the plate thickness t.

However, if the value of the plate thickness t becomes t+$t_0$ due to the error occurrence, the position of the focused spot shifts from the point P to the other point Q. In general, since the error of the plate thickness t is within almost ±0.1 mm, it can be estimated that the amount Δ of the focusing point's positional deviation may turn out to be almost ±0.1 mm. On the other hand, regarding the Wollaston prism 20 shown in FIG. 20a, the separation of the reflection light rays b from the emission light rays a is done by adjusting the separation angle θ. On this occasion, since the error of the separation angle θ is within almost ±0.03°, assuming that the distance between the prism 20 and the light-receiving element 16 is equal to 5 mm, the amount Δ of the positional deviation of the focusing position is expressed as follows:

$$\Delta = 5\tan 0.03° \text{ mm}$$
$$= 0.0026 \text{ mm}$$

It is apparent from the above equation that the value Δ thereof is small, namely, almost $\frac{1}{50}$, compared with the value Δ of the PBS prism 13.

In such situation, it is possible to make smaller the extent of the unevenness in the positional deviation amount Δ due to the accuracy (error) of the individual parts in the case of employing the Wollaston prism 20, than in the case of employing the PBS prism 13.

Therefore, the offset rate of the detected signal can be suppressed to smaller value. Consequently, both of the light consuming rate and the polarizing/separating angle accuracy can be further improved. Furthermore, the unevenness of the assembling error can be reduced, and thereby the yield rate can be improved and the optical head of low cost can be obtained.

Hereupon, regarding the polarizing/separating element, the prism to be employed is not limited to the Wollaston prism 20 only.

It may be allowed to employ the prism such as the "Rochon prism" or the "Senarmont prism", either one of which has a function of polarizing and separating the light rays differing in the emission angle thereof from each other in accordance with the polarizing direction.

FIG. 21 shows a modification of the seventh embodiment of the present invention. In the afore-mentioned construction shown in FIG. 19, the Wollaston prism 20 is disposed between the semiconductor laser 8 and the collimating lens 9. However, in the present modification, the Wollaston prism 20 is disposed between the collimating lens 9 and the ¼ (a quarter)-wavelength plate 10.

As mentioned above, the Wollaston prism 20 is disposed in the parallel optical path, and thereby it is possible to create a margin for the disposing space, compared with the case of disposing the same in the focusing optical path as in the case of the seventh embodiment shown in FIG. 19. Consequently, the accuracy of disposing the parts is relieved, and thereby assembling and adjusting works can be done easily.

Moreover, if the collimating lens 9 of large NA is employed for enhancing the efficiency of utilizing the light rays, the working distance (distance between the semiconductor laser 8 and the collimating lens 9) becomes small, and therefore the Wollaston prism 20 cannot be disposed. However, there arises no problem concerning the construction arranged according to the present embodiment.

Figure 22:
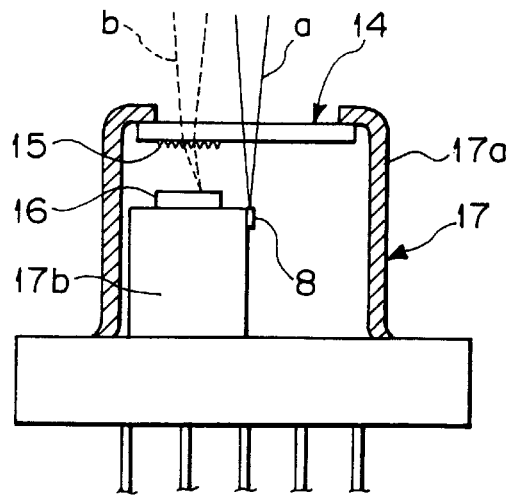
FIG. 22 is a vertical sectional side view showing the construction of an optical head in the package thereof in the eighth embodiment according to the present embodiment.

Next, the eighth embodiment according to the present invention is explained referring to FIG. 22. The explanation of the same portion as that of the fifth through seventh embodiments is omitted, and same reference numeral is attached to the same portion.

In the present embodiment, transmission-type diffraction element 14 containing the diffraction grating 15 is unitarily mounted on the window cap 17a of the package 17 hermetically sealing the semiconductor laser 8 and the light-receiving element 16 therein, in the optical head of the fifth through seventh embodiments. The semiconductor laser 8 and the light-receiving element 16 are respectively mounted on the side surface and the upper surface of the stem 17b.

The diffraction grating 15 is disposed above the light-receiving element 16 so as to oppose to the interior of the cap, and both end portions of the substrate 14a are fixed on the upper inner wall of the window cap 17a. In such construction, since the package 17 is constructed such that the semiconductor laser 8, the light-receiving element 16, and the diffraction grating 15 are unitarily combined, the construction can be made further compact. And further, the assembling works can be stabilized due to such unitary construction, and such construction turns out to be dust-proof and scratch-proof by disposing the grating surface so as to oppose to the interior of the cap and thereby the structure thereof can be made further stabilized. Furthermore, if a method of not adjusting the diffraction grating 15 in the optical axis direction (knife-edge method) is adopted, the diffraction grating can be finely adjusted and fixed at the time of sealing the window cap 17a and thereby the assembling works can be made easily.

Next, the tenth and eleventh embodiments are explained referring to FIGS. 9 through 12. The explanation of the same portion as that of the fifth through eighth embodiments is omitted, and the same reference numeral is attached to the same portion.

In all of the former embodiments described heretofore, the case in which a function of performing polarization/separation (PBS prism 13 and Wollaston prism 20) and another function of dividing the light rays (diffraction grating 15 and 18) performed by use of the optical isolator construction respectively exist separately has been described heretofore.

Figure 23:
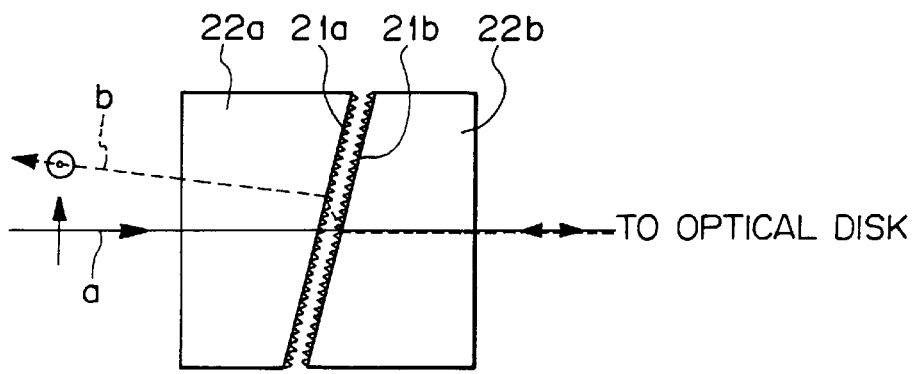
FIG. 23 is an optical route diagram showing a partial construction of the ninth embodiment of an optical head according to the present invention.

In the present embodiment, the above-mentioned two functions can be realized by use of only one element. Namely, as shown in FIG. 23, the diffraciton gratings 21a and 21b having the light-dividing function and the polarizing/separating function in which the diffraction efficiency varies in accordance with the polarizing direction are adjacently disposed so as to oppose to each other, on the optical route between the semiconductor laser 8 and the objective lens 11.

Those diffraction gratings 21a and 21b are respectively formed on one surface of the prisms 22a and 22b.

On this occasion, the grating is slantedly disposed in relation to the optical axis in order to Bragg Angle for the light rays.

The separation angle can be made small by employing two gratings, and further the diffraction angle variation due to the wavelength variation can be canceled.

Figure 24A:
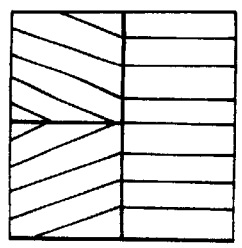
FIG. 24a is a front view showing an area-separated diffraction grating and FIG. 24b is a front view showing an area-not-separated diffraction grating.
Figure 24B:
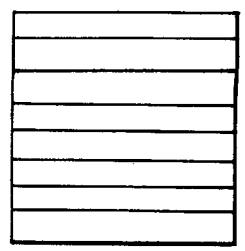

FIGS. 24a and 24b are views showing the grating shapes of the diffraction gratings 21a and 21b.

The grating shape of at least one (diffraciton grating 21a) of the diffraciton gratings 21a and 21b is formed such that the grating pitch or the grating vector direction differs from each other.

The case of polarization-dependability regarding the diffraction efficiency of the diffraction grating having the deep (aspect ratio; not less than 1.5) grating form of small pitch (not less than 1 μm) and high density is described hereinafter.

In such construction as mentioned heretofore, since the polarizing direction of the outgoing emission light rays a emitted from the semiconductor laser 8 is perpendicular to the grating, almost 90~100% of the outgoing emission light rays a pass through the diffraction grating as it is without being diffracted, and the same are radiated onto the surface of the optical disk 12. The polarizing direction of the reflection light rays b reflected on the optical disk 12 is rotated by 90° by use of the ¼ (a quarter)-wavelength plate 10, and the reflection light rays progress forward in a state of parallel polarized light rays and are diffracted respectively by the diffraction gratings 21a and 21b with the efficiency of almost 90~100% and directed to the light-receiving element 16. Since the diffraction grating 21a is divided into plural areas,it is possible to cause those areas to correspond to various sorts of signal detecting methods. Namely, various sorts of signal can be detected by employing the diffraction light rays and the transmission light rays both created in those areas. In such manner, since the present embodiment employs two pieces of diffraction gratings 21a and 21b, the number of employed parts can be reduced. And, in addition, the diffraction angle variation due to the wavelength variation which is a defect owned by the diffraction grating itself can be canceled.

Furthermore, since two pieces of the diffraction gratings 21a and 21b are put together and adjacently disposed to each other, the occurence of astigmatism can be suppressed to the utmost. And further, if two pieces of the prisms 22a and 22b are unitarily united into one, the structure thereof becomes in a state of a cube prism having no grating surface on the united prism at the side of the incident light rays.

Figure 25:
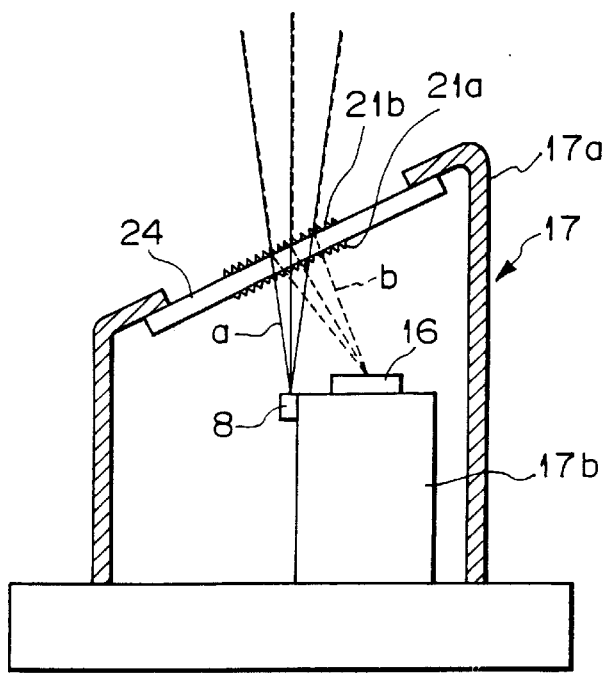
FIG. 25 is a vertical sectional side view showing the construction of an optical head in the package thereof in the eleventh embodiment according to the present invention.

FIG. 25 shows the first modification of the present embodiment. In the modification, the diffraction gratings 21a and 21b are formed on both surfaces of a thin substrate 24. The substrate 24 is mounted on the upper portion of the window cap 17a constructing the package 17 in a state of being slanted in relation to the optical axis. In such manner, the possibility of realizing a compact construction may be much higher by unitarily combining two pieces of the diffraction gratings 21a and 21b with the semiconductor laser 8 and the light-receiving element 16.

Figure 26:
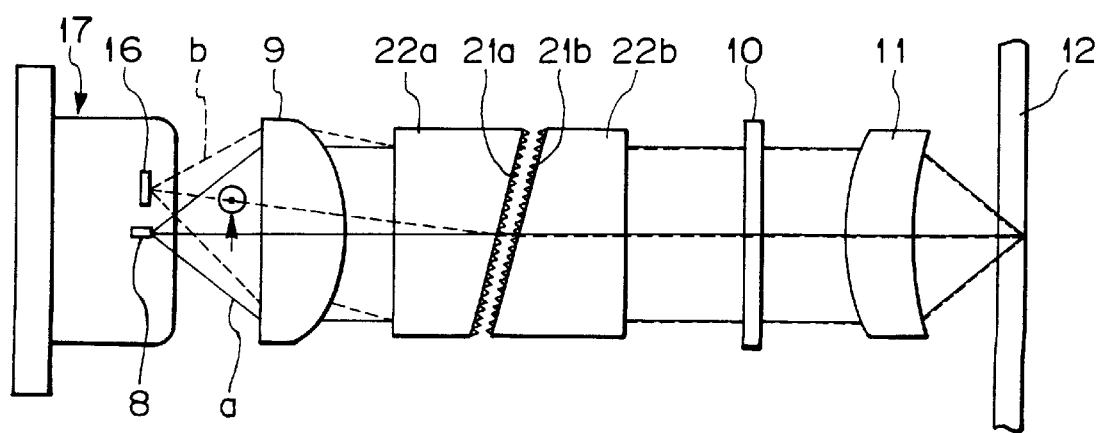
FIG. 26 is an optical route showing the construction of an optical head in the case of distributing the prism having the diffraction grating in the parallel optical route.

FIG. 26 shows the second modification of the present embodiment. In the afore-mentioned construction as shown in FIG. 23 and FIG. 25, two pieces of diffraction gratings 21a and 21b are disposed on the light-focusing optical path between the semiconductor laser 8 and the collimating lens 9. However, in the second modification, the diffraction gratings 21a and 21b are disposed on the parallel optical path between the collimating lens 9 and the ¼ (a quarter)-wavelength plate 10.

Since the present diffraction gratings 21a and 21b are formed on the two prisms 22a and 22b or on the substrate which is parallel flat plate, the phenomenon of astigmatism may be apt to occur easily when the dispersion (emanation) light rays enter the diffraction gratings 21a and 21b as the incident light rays. However, if the above parallel flat plate (substrate) is disposed in the parallel optical route, the probability of the astigmatism occurrence may be come very small. In such situation, the collimating lens 9 of large NA can be employed as in the case of the afore-mentioned embodiment shown in FIG. 21 and thereby the efficiency of utilizing the light rays can be improved. Furthermore, since all of the angle of the incident light rays entering the diffraction gratings 21a and 21b may become Bragg Angle, the light extinguishing rate is improved, furthermore the noise caused by the returning light rays of the out-going emission light rays can be reduced.

Next, the ninth and twelfth embodiments of the present invention are explained referring to FIG. 27. The explanation of the same portion as that of the fifth through eighth, tenth, and eleventh embodiments is omitted, and the same reference numeral is attached to the same portion.

Figure 27A:
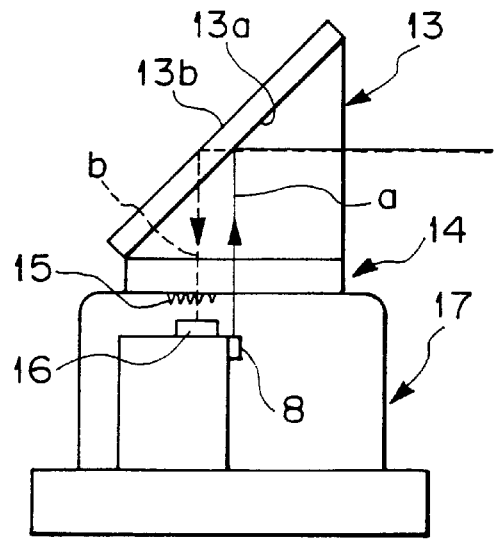
FIGS. 27a through 27d are side elevational views respectively showing the construction of the package portions in various optical heads in the ninth and twelfth embodiments.

The present embodiment shows an example in the case of unitarily constructing the element having the function of separating the light rays, the diffraction grating, and the laser light source, all of which are mentioned heretofore in the respective embodiments. In FIG. 27a, the PBS prism 13 having the polarizing film 13a in the fifth embodiment (refer to FIG. 15), the transmission-type diffraction element 14 having the diffraction grating 15, the semiconductor laser 8, and the light-receiving element 16 are unitarily constructed.

Figure 27B:
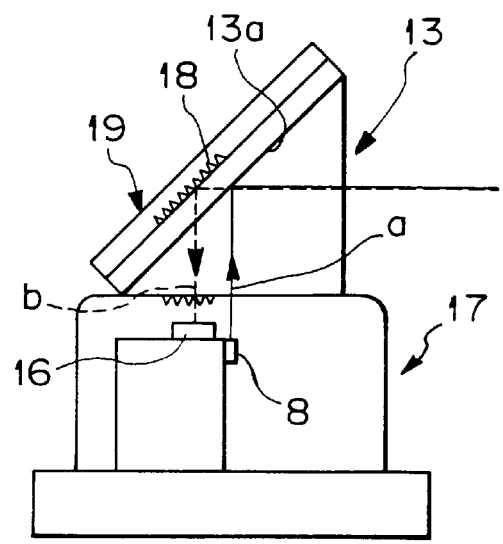

In FIG. 27b, the PBS prism 13 having the polarizing film 13a in the sixth embodiment (refer to FIG. 17), the reflection-type diffraction element 19 having the diffraction grating 18, the semiconductor laser 8, and the light-receiving element 16 are unitarily constructed.

Figure 27C:
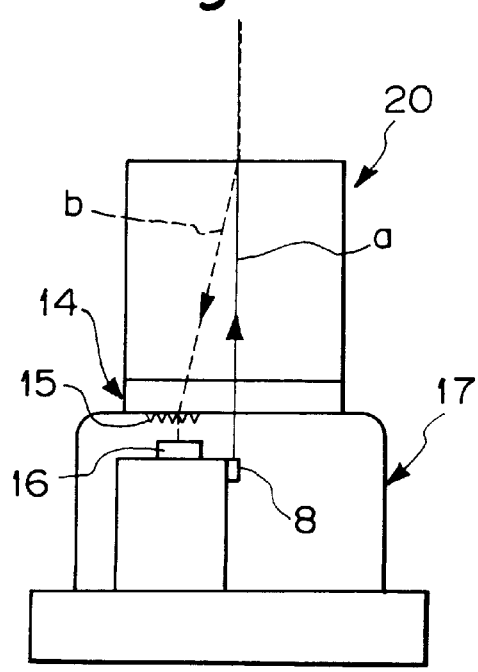

In FIG. 27c, the Wollaston prism 20 having the polarizing/separating function in the seventh embodiment (refer to FIG. 19), the transmission-type diffraction element 14 having the diffraction grating 15, the semiconductor laser 8, and the light-receiving element 16 are unitarily constructed.

Figure 27D:
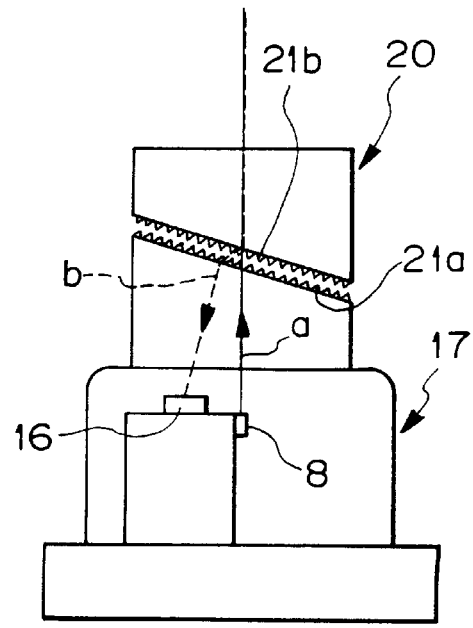
Figure 28:
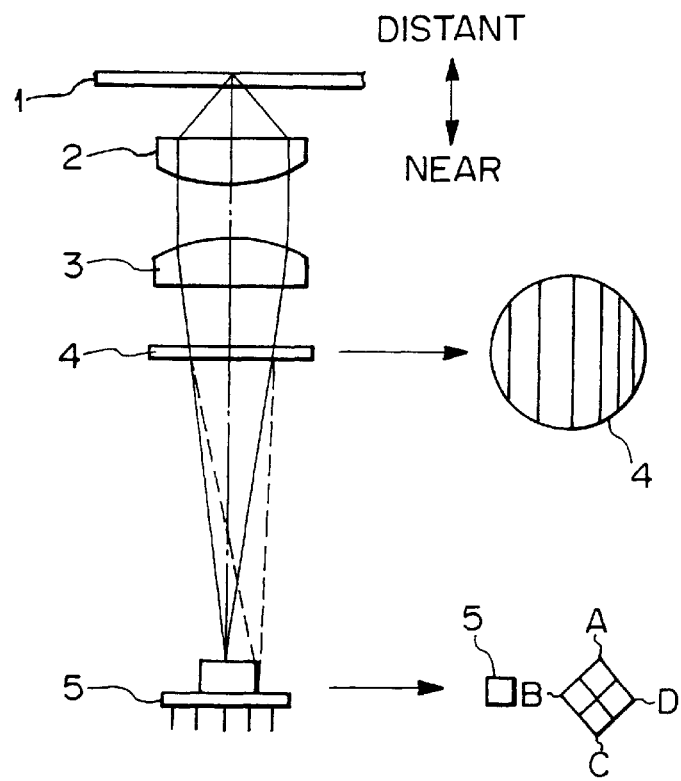
FIG. 28 is an outlined side view showing the conventional optical pick-up employing the diffraction grating devised by Lee, et al.
Figure 29:
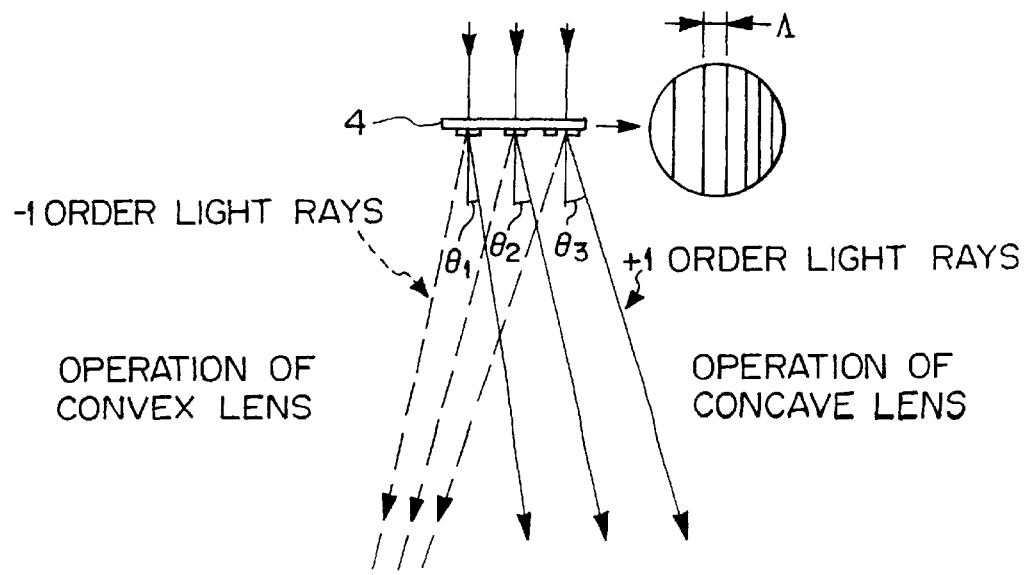
FIG. 29 is an explanatory diagram for explaining the diffracting light rays of the diffraction grating in the above-mentioned conventional optical pick-up.
Figure 32:
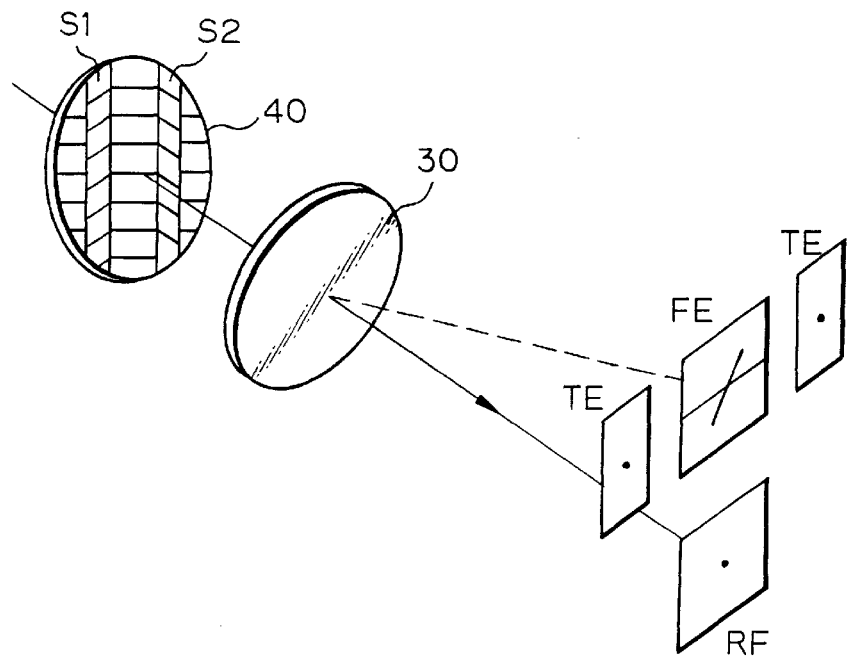
FIG. 32 is an outline perspective view of the conventional optical pick-up detecting the focus signal by performing the charp treatment on the grating of the diffraction grating and further detecting the track signal by causing a part of the diffraction grating to have a pitch distribution.
Figure 33:
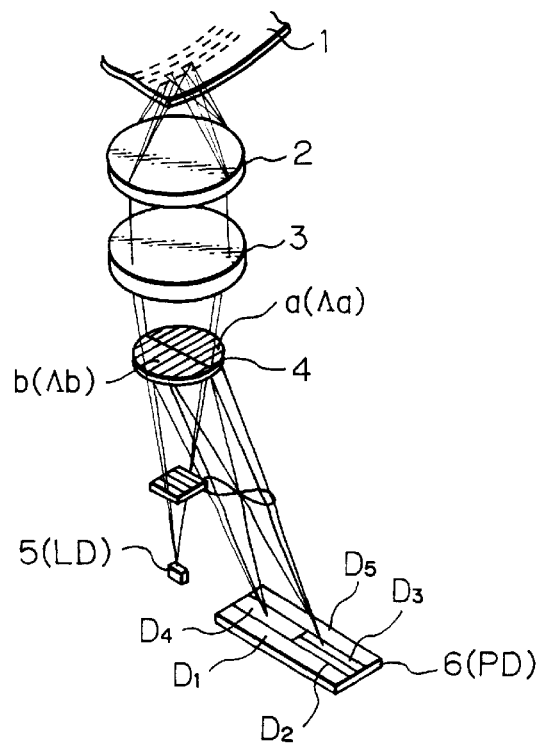
FIG. 33 is an outlined perspective view showing the conventional optical pick up employing the diffraction grating made by Sharp.

In FIG. 27d, the diffraction gratings 21a and 21b having the light-separating function and the polarizing/separating function in the tenth embodiment (refer to FIG. 23), the semiconductor 8, and the light-receiving element 16 are unitarily constructed.

In such construction as mentioned above, it is possible to realize the optical head which is stable against the time-elapsing variation and further small-sized. Furthermore, since the housing is made of plastic, the optical head can be made lightweight. And further, it is possible to realize a high-speed access. The semiconductor laser 8 is sealed by directly using the element having the polarizing/separating function and the diffraction grating, and thereby it is not necessary to employ the window cap 17a and the manufacturing process can be made simplified.

In addition, it is devised to mount the diffraction grating on the stem except for the conventional package 17 such as TO–5.

Even on that occasion, the manufacturing process can be simplified, and the reliability thereof can be assured.

In the optical head of the fifth embodiment for performing the operation of recording and erasing the information by focusing the outgoing emission light rays emitted from the laser light source by use of the objective lens and radiating the light spot on the optical information recording medium, and further for performing the operation of reproducing the information by guiding the reflection light rays reflected on the recording medium to the light-receiving element, a prism having the polarizing film entirely formed on one surface thereof is disposed on the optical route between the afore-mentioned laser light source and the afore-mentioned objective lens, and the transmission-type diffraction element having the diffraction grating guiding only the reflected light rays to the afore-mentioned light-receiving element is disposed on the optical route in which the outgoing emission light rays emitted from the laser light source do not pass through and the reflection light rays reflected on the optical information recording medium pass through the afore-mentioned prism. Consequently, the present embodiment solves the problems that the amount(intensity) of the light rays radiated onto the optical information recording medium decreases and that a part of the reflection light rays reflected on the surface of the above recording medium are not guided to the light-receiving element, both as in the conventional case. Furthermore, the efficiency of utilizing the light rays can be improved, and further the low-cost optical head employing the laser light rays of low power can be realized.

In the optical head of the sixth embodiment for performing the operation of recording and erasing the information by focusing the outgoing emission light rays emitted from the laser light source by use of the objective lens and radiating the light spot on the optical information recording medium, and further for performing the operation of reproducing the information by guiding the reflection light rays reflected on the recording medium to the light-receiving element, a prism having the polarizing film entirely formed on one surface thereof is disposed on the optical route between the afore-mentioned laser light source and the afore-mentioned objective lens, and the reflection-type diffraction element having the diffraction grating is bonded with adhesive agents and fixed to the surface opposing to the other surface of the prism having the polarizing film formed thereon with a constant thickness(distance) so as to obtain a unitary structure.

In such construction, the outgoing emission light rays directing toward the optical information recording medium do not pass through the substrate of the diffraciton grating, and further the radiated light rays do not vary at all at the time of assembling/adjusting the diffraction grating. Consequently, it is possible to realize the optical head which can be stably assembled and adjusted. Furthermore, the efficiency of utilizing the light rays can be improved, and further the low-cost optical head can be realized.

In the optical head of the seventh embodiment for performing the operation of recording and erasing the information by focusing the outgoing emission light rays emitted from the laser light source by use of the objective lens and radiating the light spot on the optical information recording medium, and further for performing the operation of reproducing the information by guiding the reflection light rays reflected on the recording medium to the light-receiving element, a polarizing/separating element having polarizing/separating function, the emission angle of which differs from each other in accordance with the polarizing direction, is disposed on the optical route between the afore-mentioned laser light source and the afore-mentioned objective lens, and the transmission-type diffraction element having the diffaction grating guiding only the reflected light rays to the afore-mentioned polarizing/separating element, is disposed on the optical route in which the output emission light rays emitted from the laser light source do not pass through and the reflection light rays reflected on the optical information recording medium pass through the afore-mentioned prism. Consequently,it may be possible to realize the optical head in which the light extinguishing ratio and the accuracy of the polarizing/separating angle may be further improved and thereby the unevenness of the assembling error may be reduced.

Furthermore, the efficiency of utilizing the light rays can be improved, and further the low-cost optical head can be realized.

The eighth embodiment employs the semiconductor laser as the laser light source and unitarily mounts the diffraction grating on the cap for harmetically sealing the semiconductor laser, in the fifth or seventh embodiment. Consequently, the space for the optical system can be saved, and thereby the optical head can be further small-sized and stabilized owing to the unitary structure.

The ninth embodiment unitarily combines the prism or the polarizing/separating element having the polarizing film formed thereon, the diffraction grating, and the laser light source, in the fifth, sixth, or seventh embodiment. Consequently, the optical head can be more small-sized and more stabilized at the time of assembling and adjusting than in the case of the eighth embodiment.

In the optical head of the tenth embodiment for performing the operation of recording and erasing the information by focusing the outgoing emission light rays emitted from the laser light source by use of the objective lens and for radiating the light spot on the optical information recording medium, and further for performing the operation of reproducing the information by guiding the reflection light rays reflected on the recording medium to the light-receiving element, two pieces of the diffraction grating having a light separating function and a polarizing/separating function in which the diffraction efficiency varies in accordance with the polarizing direction are adjacently disposed on the optical route between the afore-mentioned laser light source and the afore-mentioned objective lens, and the grating shape of at least one of those diffraction gratings is formed such that the grating pitch or the grating vector direction differs from each other.

Consequently, the optical head has a complicated function including the light-dividing function and the polarizing/separating function, and thereby the number of the employed parts can be reduced and the cost can be lowered, and further the mass-productivity can be improved.

In addition, since the two pieces of the diffraction grating are adjacently disposed, the diffraction angle variation due to the wavelength variation which is a defect of the diffraction grating itself can be canceled. Consequently, it is possible to realize the optical head of stable performance and improved reliability.

Furthermore, the efficiency of utilizing the light rays can be improved, and further the low-cost optical head can be realized.

Since the eleventh embodiment respectively forms two pieces of the diffraction gratings on both surfaces of one substrate in the tenth embodiment, the number of the employed parts can be further reduced, the stable performance can be obtained for the time-elapsing variation, and the reliability can be improved.

Since the twelfth embodiment unitarily combines the diffraction grating having a light-dividing function and a polarizing/separating function and the laser light source, the number of the employed parts can be reduced and the optical head can be further small-sized to a higher pitch. Furthermore, the stability can be further enhanced for the time-elapsing variation.

Heretofore, the optical pick-up and the optical head has been described.

However, the present invention is not limited to the above contents. The magneto-optic pick-up and the magneto-optic head can be also applied to the technical thoughts described heretofore in the respective embodiments of the present invention.

What is claimed is:

1. An optical pick-up device in an optical recording/reproducing apparatus for radiating light rays onto a recording medium and for recording and reproducing information, said optical pick-up device comprising:
   a high-density double diffraction grating having two high-density diffraction gratings formed of an isotropic material having the same diffraction index regardless of polarization direction, one of which is superposed on the other, said high-density double diffraction grating being disposed within an optical path between a light source and said recording medium such that outgoing light rays emitted from said light source are P-polarized wherein said diffraction grating has a pitch equal to or less than a wavelength of said light rays;

a quarter wavelength plate for circularly polarizing light rays passing through said high-density double diffraction grating; and a focusing lens for focusing light rays output from said quarter wavelength plate and radiating the same onto said recording medium, wherein reflection light rays reflected from said recording medium return therefrom and are S-polarized after passing through said quarter wavelength plate and are diffracted after entering said high-density double diffraction grating to produce diffraction light rays containing focus error signal information, track error signal information, and recording signal information.

2. An optical pick-up device according to claim 1, wherein both of said two diffraction gratings are respectively disposed on front and rear surfaces of said high-density double diffraction grating and are equal-pitch, and wherein astigmatism occurring when reflection light rays focused by said focusing lens enter said equal-pitch diffraction is utilized for detecting said focus error signal information.

3. An optical pick-up device according to claim 1, wherein one of said two diffraction gratings of said high-density double diffraction grating is an equal pitch diffraction grating and said other diffraction grating is a diffraction grating manufactured with charping thereon.

4. An optical pick-up device according to claim 1, wherein at least one of said two diffraction gratings is divided into different-pitch areas.

5. An optical pick-up device according to any of claims 1–4, wherein a pitch of a diffraction grating on a front surface of said high-density double diffraction grating at a recording medium side thereof is larger than a pitch of said diffraction grating on a rear surface of said high-density double diffraction grating at a light source side thereof.

6. An optical pick-up device according to any of claims 1–4, wherein said two diffraction gratings of said high density double diffraction grating are formed on slanted surfaces of two prisms.

7. An optical pick-up device in an optical recording/reproducing apparatus for radiating light rays onto a recording medium and for recording and reproducing information, said optical pick-up device comprising:

a laser diode for emitting laser light rays;

a double diffraction grating formed of an isotropic material having the same diffraction index regardless of polarization direction for transmitting P-polarized laser light rays along a first optical path and for diffracting S-polarized laser light rays along a second optical path wherein said diffraction grating has a pitch equal to or less than a wavelength of said laser light rays;

an objective lens for focusing said laser light rays onto an optical disk for recording information; and a light-detection photodiode for detecting a focus error signal, a track error signal, and a recording signal.

8. An optical pick-up device according to claim 7, wherein said recording signal is a radio frequency signal.

9. An optical pick-up device in an optical recording/reproducing apparatus for radiating light rays onto a recording medium and for recording and reproducing information, said optical pick-up device comprising:

a laser diode for emitting laser light rays;

a double diffraction grating formed of an isotropic material having the same diffraction index regardless of polarization direction for transmitting said laser light rays along a first optical path and for diffracting said laser light rays along a second optical path wherein said diffraction grating has a pitch equal to or less than a wavelength of said laser light rays;

a quarter wavelength plate for converting P-polarized laser light rays to circularly-polarized laser light rays along said first optical path and for converting said circularly-polarized laser light rays to S-polarized laser light rays;

an objective lens for focusing said S-polarized laser light rays onto an optical disk for recording information; and a light-detection photodiode for detecting a focus error signal, a track error signal, and a recording signal.

10. An optical pick-up device according to claim 9, wherein said recording signal is a radio frequency signal.

11. A method of recording and reproducing information via an optical pick-up device in an optical recording/reproducing apparatus for radiating light rays onto a recording medium and for recording and reproducing information, said method comprising the steps of:

emitting laser light rays from a laser diode;

transmitting P-polarized light rays along a first optical path and diffracting S-polarized laser light rays along a second optical path via a double diffraction grating formed of an isotropic material having the same diffraction index regardless of polarization direction wherein said diffraction grating has a pitch equal to or less than a wavelength of said laser light rays;

focusing said laser light rays onto an optical disk via an objective lens;

recording information on said optical disk; and detecting a focus error signal, a track error signal, and a recording signal via a light-detection photodiode.

12. A method of recording and reproducing information according to claim 11, wherein said recording signal is a radio frequency signal.

13. A method of recording and reproducing information via an optical pick-up device in an optical recording/reproducing apparatus for radiating light rays onto a recording medium and for recording and reproducing information, said method comprising the steps of:

emitting laser light rays from a laser diode;

transmitting said laser light rays along a first optical path and diffracting said laser light rays along a second optical path via a double diffraction grating formed of an isotropic material having the same diffraction index regardless of polarization direction wherein said diffraction grating has a pitch equal to or less than a wavelength of said laser light rays;

converting P-polarized laser light rays to circularly-polarized laser light rays along said first optical path and converting said circularly-polarized laser light rays to S-polarized laser light rays via a quarter wavelength plate;

focusing said S-polarized laser light rays onto an optical disk via an objective lens;

recording information on said optical disk; and detecting a focus error signal, a track error signal, and a recording signal via a light-detection photodiode.

14. A method of recording and reproducing information according to claim 13, wherein said recording signal is a radio frequency signal.

* * * * *